United States Patent [19]

Fishbine et al.

[11] Patent Number: 4,792,226
[45] Date of Patent: Dec. 20, 1988

[54] OPTICAL FINGERPRINTING SYSTEM

[75] Inventors: Glenn M. Fishbine, Eden Prairie; Eric W. Laveen, Eagan; James M. Kaufman, Eden Prairie; Theodore D. Klein, Mound; William T. Warner, Eden Prairie, all of Minn.

[73] Assignee: C.F.A. Technologies, Inc., St. Louis Park, Minn.

[21] Appl. No.: 20,326

[22] Filed: Feb. 27, 1987

[51] Int. Cl.$^4$ .......................... G06K 9/24; G06K 9/32
[52] U.S. Cl. ...................... 356/71; 350/286; 354/62; 382/4
[58] Field of Search .......... 356/71; 382/4, 5; 354/62

[56] References Cited

U.S. PATENT DOCUMENTS

| | | | |
|---|---|---|---|
| 3,200,701 | 8/1965 | White | 356/71 |
| 3,478,658 | 11/1969 | Hu et al. | 354/62 |
| 3,482,498 | 12/1969 | Becker | 354/62 |
| 3,581,282 | 5/1971 | Altman | 382/4 |
| 3,614,737 | 10/1971 | Sadowsky | 382/4 |
| 3,639,905 | 2/1972 | Yaida et al. | 382/4 |
| 3,648,240 | 3/1972 | Jacoby et al. | 382/4 |
| 3,944,978 | 3/1976 | Jensen et al. | 382/4 |
| 3,968,476 | 7/1976 | McMahon | 382/4 |
| 3,975,711 | 8/1976 | McMahon | 382/4 |
| 4,107,775 | 8/1978 | Ott | 364/413 |
| 4,120,585 | 10/1978 | DePalma et al. | 346/71 |
| 4,151,512 | 4/1979 | Riganati et al. | 382/5 |
| 4,186,378 | 1/1980 | Moulton | 382/4 |
| 4,206,441 | 6/1980 | Kondo | 382/4 |
| 4,227,805 | 10/1980 | Schiller | 356/71 |
| 4,236,082 | 11/1980 | Butler | 250/461 R |
| 4,246,568 | 1/1981 | Peterson | 382/4 |
| 4,322,163 | 3/1982 | Schiller | 356/71 |
| 4,340,300 | 7/1982 | Ruell | 356/71 |
| 4,357,597 | 11/1982 | Butler | 382/4 |
| 4,385,831 | 5/1983 | Ruell | 356/71 |
| 4,428,670 | 1/1984 | Ruell et al. | 356/71 |
| 4,429,413 | 1/1984 | Edwards | 382/4 |
| 4,455,083 | 6/1984 | Elmes | 356/71 |
| 4,544,267 | 10/1985 | Schiller | 356/71 |
| 4,553,837 | 11/1985 | Marcus | 356/71 |
| 4,569,080 | 2/1986 | Schiller | 382/4 |
| 4,652,116 | 3/1987 | Rios | 354/62 X |

Primary Examiner—Vincent P. McGraw
Attorney, Agent, or Firm—Kinney & Lange

[57] ABSTRACT

An optical fingerprinting system includes an optics/processor unit, a video monitor, a data terminal, and a printer. The optics/processor unit includes a slap print prism for providing slap fingerprint images, and a plurality of individual finger prisms having differently sized finger-receiving grooves for providing individual fingerprint images. Slap/finger image selection optics selectively propagate fingerprint images from one of the individual finger prisms or slap print prism to a video camera. A video monitor is coupled to the camera, and provides a real-time display of the fingerprints being imaged. When a desired fingerprint image is observed on the monitor, an appropriate key of a key pad on the optics/processor unit is actuated and digital data characteristic of this image stored in memory. Following this procedure, data characteristic of all ten individual fingerprints and slap prints of both hands is stored. Demographic information of the person being fingerprinted is entered through the data terminal. The demographic information and fingerprint images can be printed at appropriate locations on a standard booking or applicant card.

16 Claims, 28 Drawing Sheets

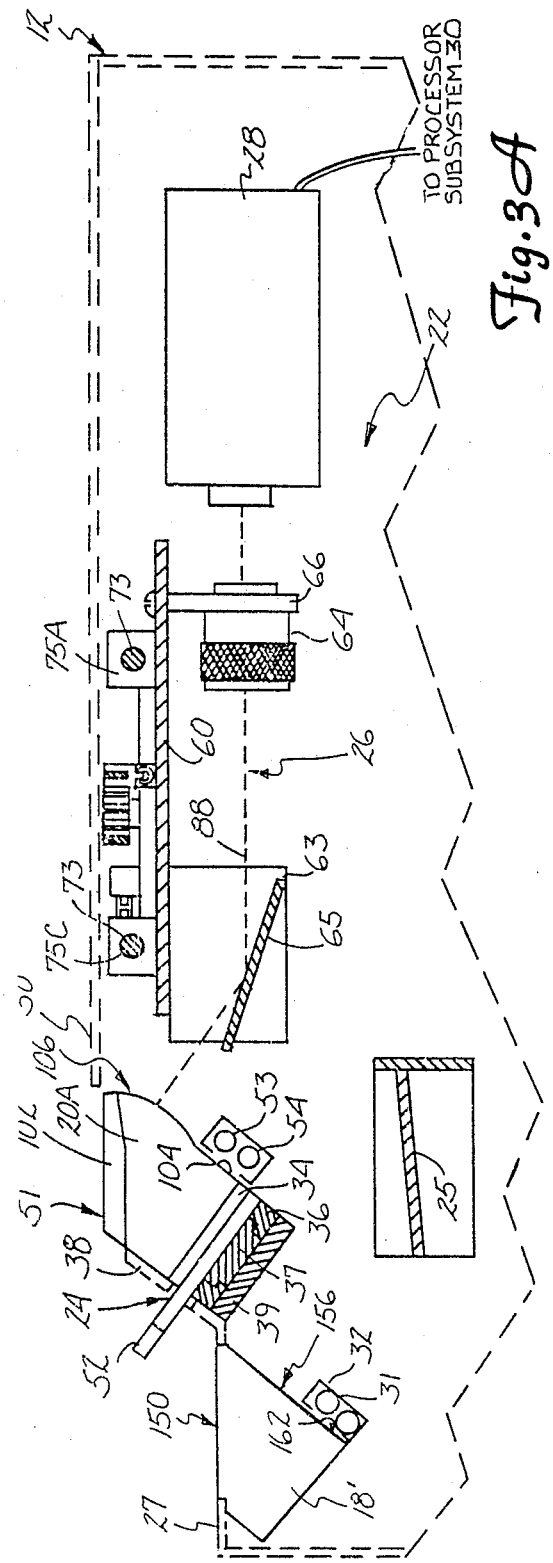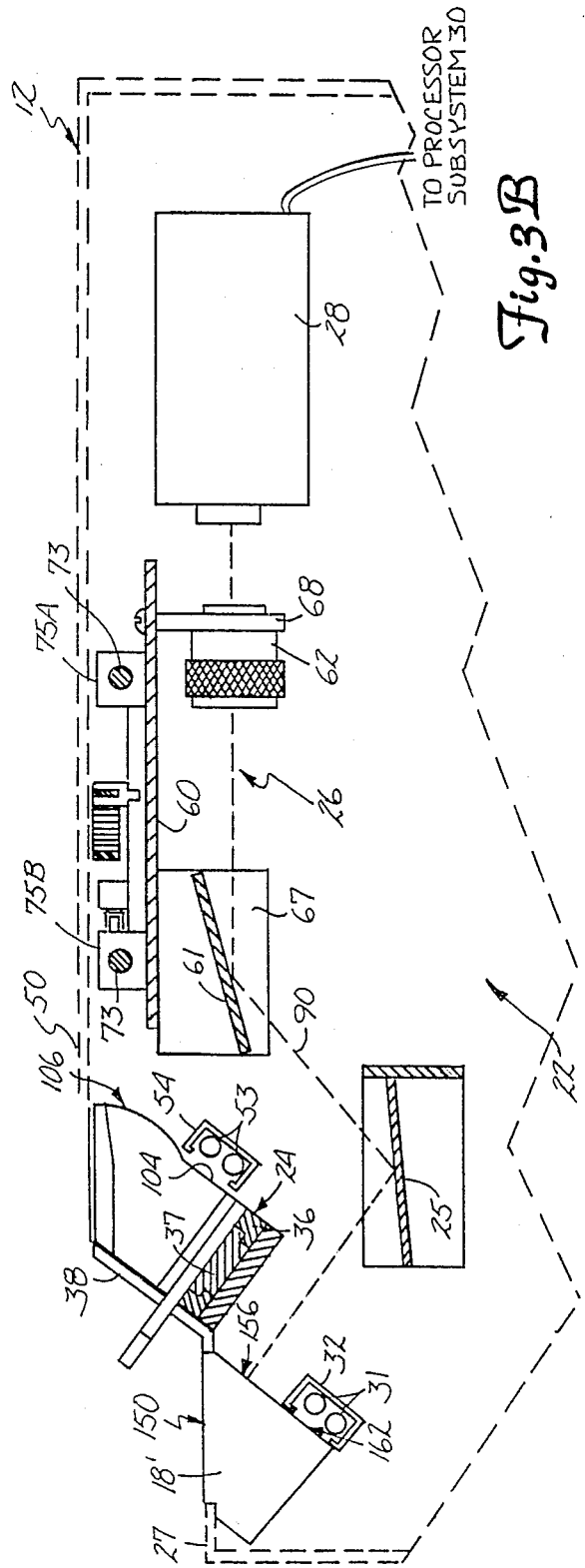

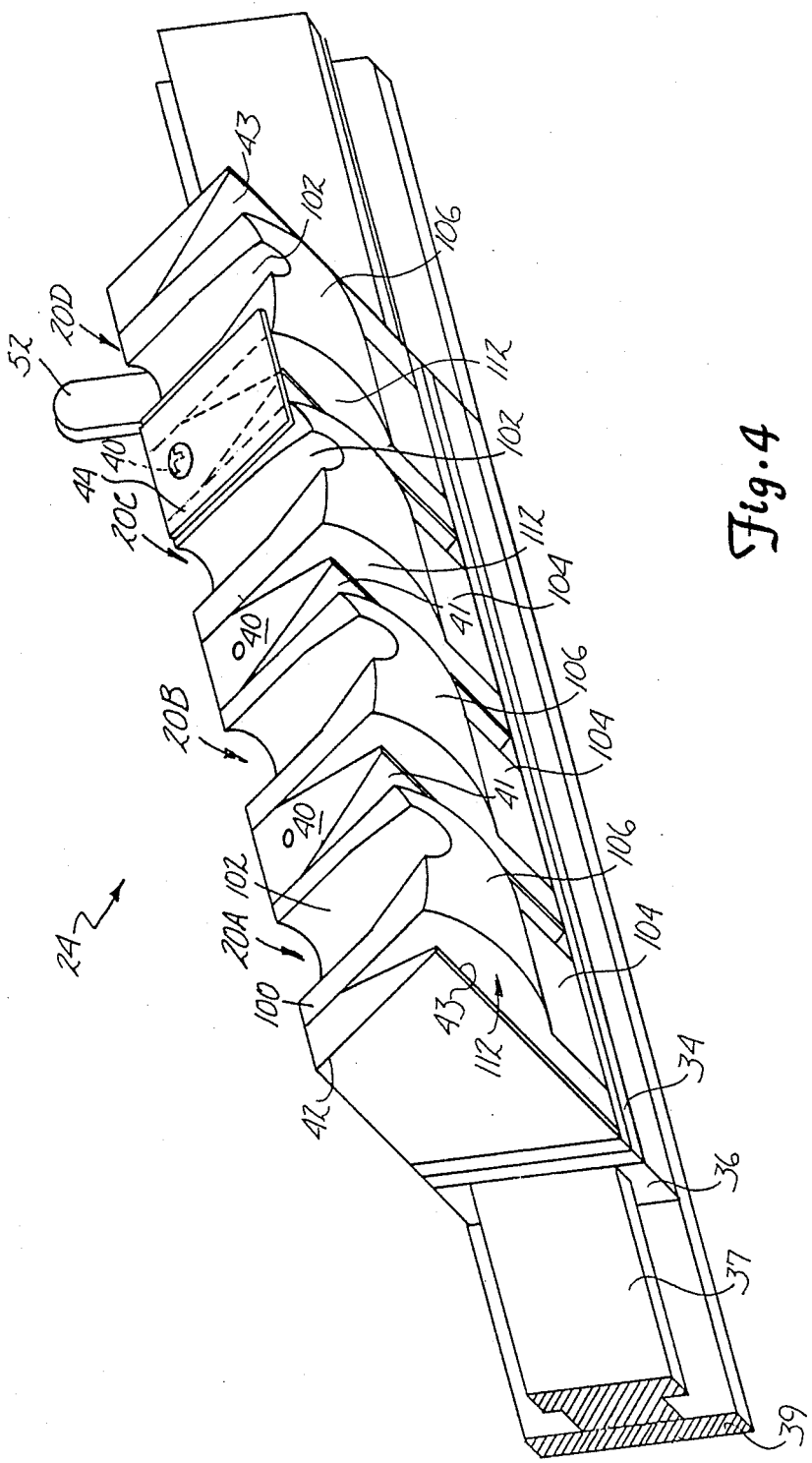

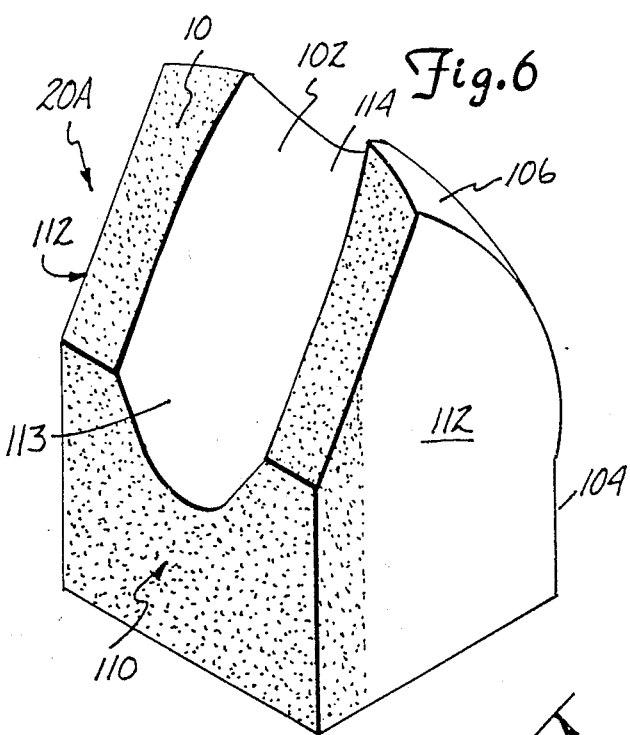
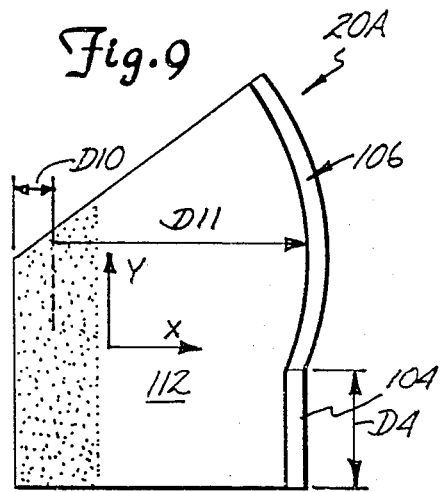
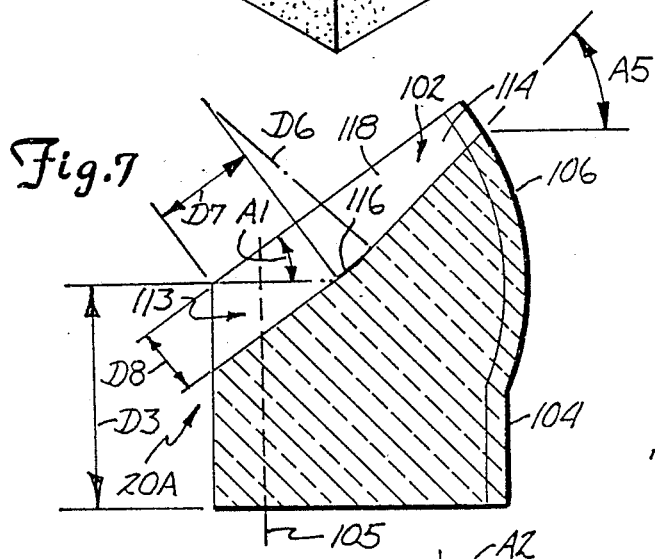
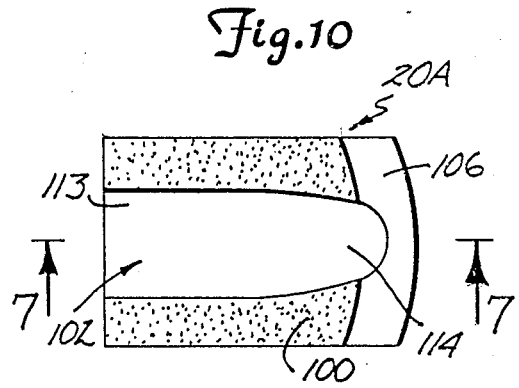
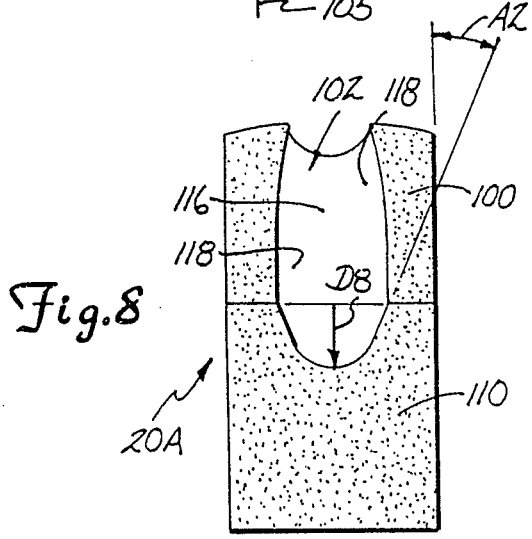
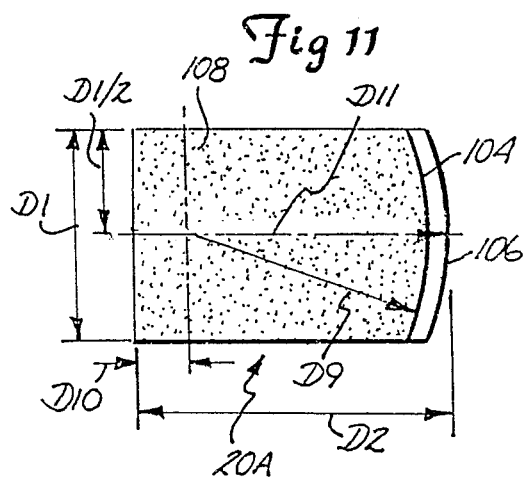

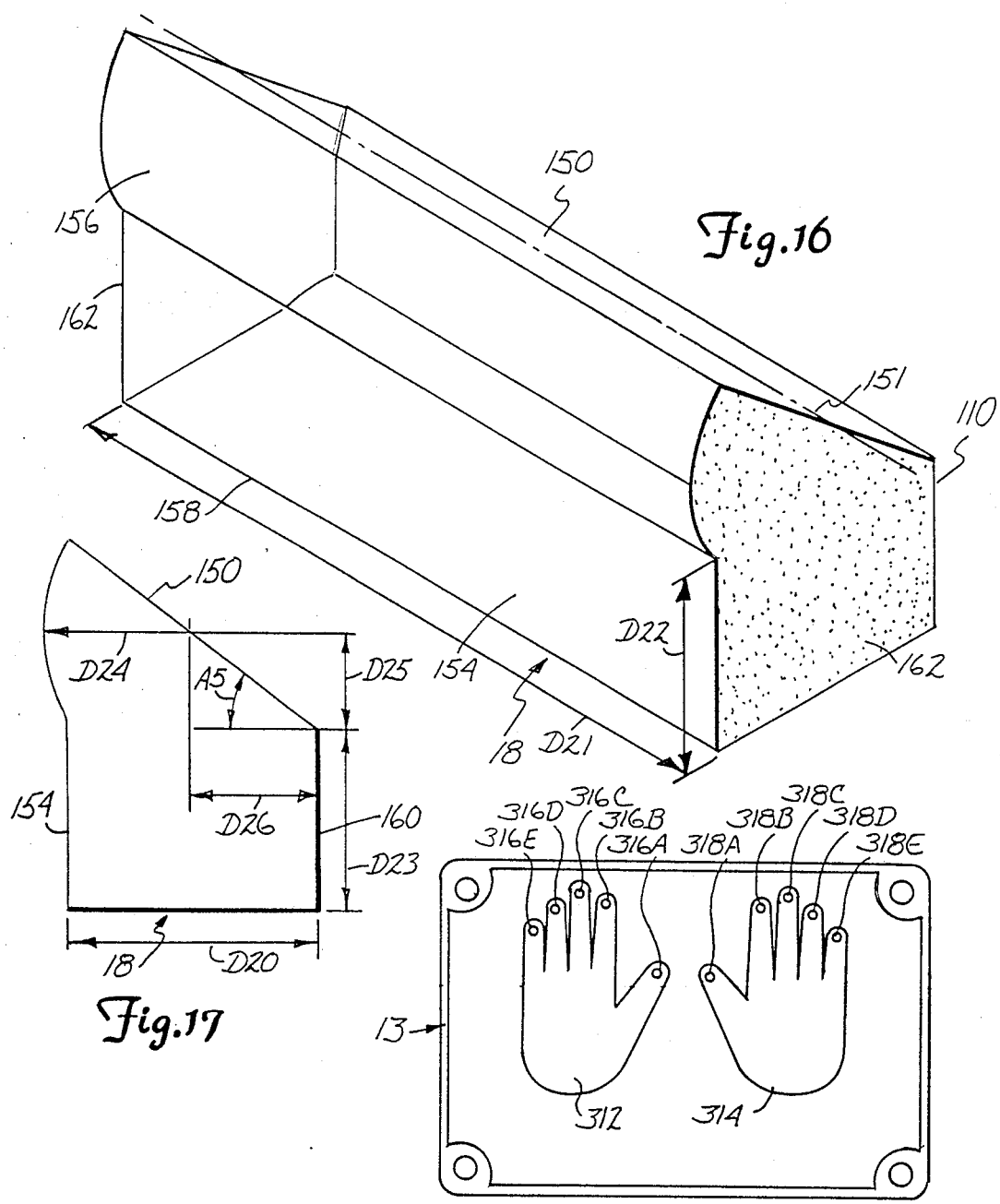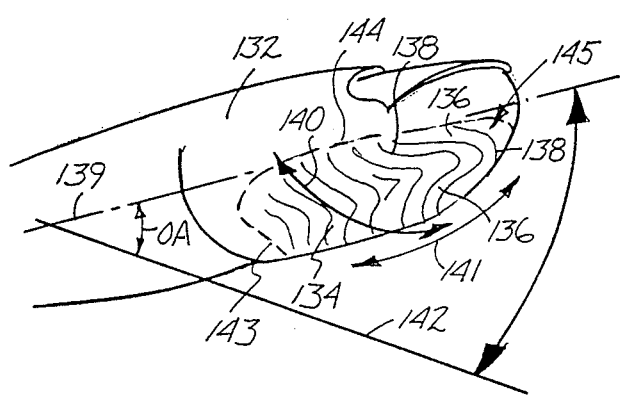

| $PV1,1_I$ $PL1,1$ | $PV1,2_I$ | $PV1,3_I$ | $PV1,4_I$ | $PV1,5_I$ | $PV1,6_I$ | $PV1,7_I$ | ... | | $PV1,M_I$ |
|---|---|---|---|---|---|---|---|---|---|
| $PV2,1_I$ | $PV2,2_I$ | $PV2,3_I$ | | | | | | | |
| $PV3,1_I$ | $PV3,2_I$ | $PV3,3_I$ | | | | | | | |
| $PV4,1_I$ | | | $PVn-1, m-1_I$ | $PVn-1, m_I$ | $PVn-1, m+1_I$ | | | | |
| $PV5,1_I$ $PLS,1$ | | $PLN,M$ | $PVn, m-1_I$ | $PVn, m_I$ | $PVn, m+1_I$ | | | | |
| $PV6,1_I$ | | $PLn, m-1$ | $PVn+1, m-1_I$ | $PVn+1, m_I$ | $PVn+1, m+1_I$ | | | | |
| $PV7,1_I$ | | | | | | | | | |

| $PLN-1,1$ $PVN-1, 1_I$ | | | | | | | | $PLN-1,M$ $PVN-1, M-1_I$ | $PVN-1, M_I$ |
|---|---|---|---|---|---|---|---|---|---|
| $PLN,1$ $PVN,1_I$ | $PVN,2_I$ | $PVN,3_I$ | $PVN,4_I$ | $PVN,5_I$ | $PVN,6_I$ | $PVN,7_I$ | ... | $PVN, M-1_I$ | $PVN, M_I$ $PLN,M$ |

| PV1,1_N | PV1,2_N | PV1,3_N | PV1,4_N | PV1,5_N | PV1,6_N | PV1,7_N | ... | PV1, M-1_N | PV1,M_N |
|---|---|---|---|---|---|---|---|---|---|
| PV2,1_N | PV2,2_N | PV2,3_N | | | | | | | |
| PV3,1_N | PV3,2_N | PV3,3_N | | | | | | | |
| PV4,1_N | | | PVn-1, m-1_N | PVn-1, m_N | PVn-1, m+1_N | | | | |
| PV5,1_N | | | PVn, m-1_N | PVn, m_N | PVn, m+1_N | | | | |
| PV6,1_N | | | PVn+1, m-1_N | PVn+1, m_N | PVn+1, m+1_N | | | | |
| PV7,1_N | | | | | | | | | |

...

| PVN-1, 1_N | | | | | | | | PVN-1, M-1_N | PVN-1, M_N |
|---|---|---|---|---|---|---|---|---|---|
| PVN,1_M | PVN2_M | PVN3_N | PVN4_N | PVN5_N | PVN6_N | PVN7_N | ... | PVN, M-1_N | PVN, M_N |

NAA

| $PV1,1_E$ | $PV1,2_E$ | $PV1,3_E$ | $PV1,4_E$ | $PV1,5_E$ | $PV1,6_E$ | $PV1,7_E$ | ... | $PV1, M-1_E$ | $PV1,M_E$ |
|---|---|---|---|---|---|---|---|---|---|
| $PV2,1_E$ | | | | | | | | | |
| $PV3,1_E$ | | | | | | | | | |
| $PV4,1_E$ | | | $PVn-1, m-1_E$ | $PVn-1, m_E$ | $PVn-1, m+1_E$ | | | | |
| $PV5,1_E$ | | | $PVn, m-1_E$ | $PVn, m_E$ | $PVn, m+1_E$ | | | | |
| $PV6,1_E$ | | | $PVn+1, m-1_E$ | $PVn+1, m_E$ | $PVn+1, m+1_E$ | | | | |
| $PV7,1_E$ | | | | | | | | | |

⋮

| $PVN-1, 1_E$ | | | | | | | | $PVN-1, M-1_E$ | $PVN-1, M_E$ |
|---|---|---|---|---|---|---|---|---|---|
| $PVN,1_E$ | $PVN2_E$ | $PVN3_E$ | $PVN4_E$ | $PVN5_E$ | $PVN6_E$ | $PVN7_E$ | ... | $PVN, M-1_E$ | $PVN, M_E$ |

IEA

Fig.23

| PV1,1$_N$ | PV1,2$_N$ | PV1,3$_N$ | PV1,4$_N$ | PV1,5$_N$ | PV1,6$_N$ | PV1,7$_N$ | ... | PV1, M-1$_N$ | PV1,M$_N$ |
|---|---|---|---|---|---|---|---|---|---|
| PV2,1$_N$ | PV2,2$_N$ | PV2,3$_N$ | | | | | | | |
| PV3,1$_N$ | PV3,2$_N$ | PV3,3$_N$ | | | | | | | |
| PV4,1$_N$ | | | PV$n$-1, $m$-1$_N$ | PV$n$-1, $m_N$ | PV$n$-1, $m$+1$_N$ | | | | |
| PV5,1$_N$ | | | PV$n$, $m$-1$_N$ | PV$n$, $m_N$ | PV$n$, $m$+1$_N$ | | | | |
| PV6,1$_N$ | | | PV$n$+1, $m$-1$_N$ | PV$n$+1, $m_N$ | PV$n$+1, $m$+1$_N$ | | | | |
| PV7,1$_N$ | | | | | | | | | |

| PVN-1, 1$_N$ | | | | | | | | PVN-1, M-1$_N$ | PVN-1, M$_N$ |
|---|---|---|---|---|---|---|---|---|---|
| PVN,1$_M$ | PVN2$_M$ | PVN3$_N$ | PVN4$_N$ | PVN5$_N$ | PVN6$_N$ | PVN7$_N$ | ... | PVN, M-1$_N$ | PVN, M$_N$ |

NAA

| PV1,1$_D$ | PV1,2$_D$ | PV1,3$_D$ | PV1,4$_D$ | PV1,5$_D$ | PV1,6$_D$ | PV1,7$_D$ | ... | PV1, M-1$_D$ | PV1, M$_D$ |
|---|---|---|---|---|---|---|---|---|---|
| PV2,1$_D$ | | | | | | | | | |
| PV3,1$_D$ | | | | | | | | | |
| PV4,1$_D$ | | | PV$n$-1, $m$-1$_D$ | PV$n$-1, $m_D$ | PV$n$-1, $m$+1$_D$ | | | | |
| PV5,1$_D$ | | | PV$n$, $m$-1$_D$ | PV$n$, $m_D$ | PV , $m$+1$_D$ | | | | |
| PV6,1$_D$ | | | PV$n$+1, $m$-1$_D$ | PV$n$+1, $m_D$ | PV$n$+1, $m$+1$_D$ | | | | |
| PV7,1$_D$ | | | | | | | | | |
| ⋮ | | | | | | | | ⋮ | |
| PVN-1, 1$_D$ | | | | | | | | PVN-1, M-1$_D$ | PVN-1, M$_D$ |
| PVN,1$_D$ | PVN,2$_D$ | PVN,3$_D$ | PVN,4$_D$ | PVN,5$_D$ | PVN,6$_D$ | PVN,7$_D$ | ... | PVN, M-1$_D$ | PVN, M$_D$ |

DFA

Fig.25

| | | | 230A | 230B | | | | | |
|---|---|---|---|---|---|---|---|---|---|
| $PV1,1_E$ | $PV1,2_E$ | $PV1,3_E$ | $PV1,4_E$ | $PV1,5_E$ | $PV1,6_E$ | $PV1,7_E$ | ... | $PV1, M-1_E$ | $PV1,M_E$ |
| 232A $PV2,1_E$ | $PV2,2_E$ | $PV2,3_E$ | $PV2,4_E$ | $PV2,5_E$ | $PV2,6_E$ | $PV2,7_E$ | | | 232F |
| $PV3,1_E$ | $PV3,2_E$ | $PV3,3_E$ | $PV3,4_E$ | $PV3,5_E$ | $PV3,6_E$ | $PV3,7_E$ | | | |
| $PV4,1_E$ | $PV4,2_E$ | $PV4,3_E$ | $PV4,4_E$ | $PV4,5_E$ | $PV4,6_E$ | $PV4,7_E$ | | | 230E |
| $PV5,1_E$ | | | | 230G $PVn-1, m-1_E$ | $PVn-1, m_E$ | $PVn-1, m+1_E$ | | | |
| 230F $PV6,1_E$ | | 232H | | $PVn, m-1_E$ | $PVn, m_E$ | $PVn, m+1_E$ | | | |
| $PV7,1_E$ | | | | $PVn+1, m-1_E$ | $PVn+1, m_E$ | $PVn+1, m+1_E$ | | | |
| $PVN-1, 1_E$ | | | | | | | | $PVN-1, M-1_E$ | $PVN-1, M_E$ |
| $PVN,1_E$ | $PVN,2_E$ | $PVN,3_E$ | $PVN,4_E$ | $PVN,5_E$ | $PVN,6_E$ | $PVN,7_E$ | ... | $PVN, M-1_E$ | $PVN, M_E$ |

IEA

Fig. 27

| PV1,1$_U$ | PV1,2$_U$ | PV1,3$_U$ | PV1,4$_U$ | PV1,5$_U$ | PV1,6$_U$ | PV1,7$_U$ | ... | | PV1,M$_U$ |
|---|---|---|---|---|---|---|---|---|---|
| PV2,1$_U$ | | | | | | | | | |
| PV3,1$_U$ | | | | | | | | | |
| PV4,1$_U$ | | | PV$n$−1, $m$−1$_U$ | PV$n$−1, $m_U$ | PV$n$−1, $m$+1$_U$ | | | | |
| PV5,1$_U$ | | | PV$n$, $m$−1$_U$ | PV$n$, $m_U$ | PV$n$, $m$+1$_U$ | | | | |
| PV6,1$_U$ | | | PV$n$+1, $m$−1$_U$ | PV$n$+1, $m_U$ | PV$n$+1, $m$+1$_U$ | | | | |
| PV7,1$_U$ | | | | | | | | | |
| ⋮ | | | | | | | | | ⋮ |
| PVN−1, 1$_U$ | | | | | | | | PVN−1, M−1$_U$ | PVN−1, M$_U$ |
| PVN,1$_U$ | PVN.2$_U$ | PVN,3$_U$ | PVN,4$_U$ | PVN,5$_U$ | PVN,6$_U$ | PVN,7$_U$ | ... | PVN, M−1$_U$ | PVN, M$_U$ |

| $PV1,1_C$ | $PV1,2_C$ | $PV1,3_C$ | $PV1,4_C$ | $PV1,5_C$ | $PV1,6_C$ | $PV1,7_C$ |
|---|---|---|---|---|---|---|
| $PV2,1_C$ | | | | | | |
| $PV3,1_C$ | | | | | | |
| $PV4,1_C$ | | | $PVn-1, m-1_C$ | $PVn-1, m_C$ | $PVn-1, m+1_C$ | |
| $PV5,1_D$ | | | $PVn, m-1_C$ | $PVn, m_C$ | $PVn, m+1_C$ | |
| $PV6,1_D$ | | | $PVn+1, m-1_C$ | $PVn+1, m_C$ | $PVn+1, m+1_C$ | |
| $PV7,1_C$ | | | | | | |

··· | | $PV1,M_C$ |

⋮

| $PVN-1, 1_C$ | | | | | | |
|---|---|---|---|---|---|---|
| $PVN,1_C$ | $PVN,2_C$ | $PVN,3_C$ | $PVN,4_C$ | $PVN,5_C$ | $PVN,6_C$ | $PVN,7_C$ |

··· | $PVN-1, M-1_C$ | $PVN-1, M_C$ |
| $PVN, M-1$ | $PVN, M_C$ |

CCA

Fig.31

| $PV1,1_V$ | $PV1,2_V$ | $PV1,3_V$ | $PV1,4_V$ | $PV1,5_V$ | $PV1,6_V$ | $PV1,7_V$ | ... | $PVL,M-1_V$ | $PV1,M_V$ |
|---|---|---|---|---|---|---|---|---|---|
| $PV2,1_V$ | | | | | | | | | |
| $PV3,1_V$ | | | | | | | | | |
| $PV4,1_V$ | | | $PVn-1, m-1_V$ | $PVn-1, m_V$ | $PVn-1, m+1_V$ | | | | |
| $PV5,1_V$ | | | $PVn,m_V m-1_V$ | $PVn,m_V m_V$ | $PVn,m_V m+1_V$ | | | | |
| $PV6,1_V$ | | | $PVn+1 m-1_V$ | $PVn+1 m_V$ | $PVn+1 m+1_V$ | | | | |
| $PV7,1_V$ | | | | | | | | | |

| $PVN-1, 1_V$ | | | | | | | | | |
|---|---|---|---|---|---|---|---|---|---|
| $PVN,1_V$ | $PVN,2_V$ | $PVN,3_V$ | $PVN,4_V$ | $PVN,5_V$ | $PVN,6_V$ | $PVN,7_V$ | ... | $PV,M-1_V$ | $PV,M_V$ |

VA

| HORIZONTALLY SCALED ARRAY HA | VERTICALLY SCALED ARRAY VA |
|---|---|
| $PVn,1_H$ | PVMAX |
| $PVn,2_H$ | PVMAX |
| ... | ... |
| $PVn,300_H$ | $PVn,300_V$ |
| $PVn,301_H$ | $PVn,301_V$ |
| $PVn,302_H$ | $PVn,301_V$ |
| $PVn,303_H$ | $PVn,301_V$ |
| $PVn,304_H$ | $PVn,301_V$ |
| $PVn,305_H$ | $PVn,302_V$ |
| $PVn,306_H$ | $PVn,302_V$ |
| $PVn,307_H$ | $PVn,302_V$ |
| $PVn,308_H$ | $PVn,303_V$ |
| $PVn,309_H$ | $PVn,304_V$ |
| $PVn,310_H$ | $PVn,305_V$ |
| $PVn,311_H$ | $PVn,305_V$ |
| $PVn,312_H$ | $PVn,306_V$ |
| $PVn,313_H$ | $PVn,307_V$ |
| $PVn,314_H$ | $PVn,309_V$ |
| $PVn,315_H$ | $PVn,310_V$ |
| $PVn,316_H$ | $PVn,311_V$ |
| ... | ... |
| $PVn,M-1_H$ | PVMAX |
| $PVn,M_H$ | PVMAX |

Fig. 40

| VERTICALLY SCALED ARRAY VA | CURVATURE CORRECTED ARRAY CCA |
|---|---|
| $PV1,m_V$ | PVMAX |
| $PV2,m_V$ | PVMAX |
| ... | ... |
| $PV200,m_V$ | $PV200,m_C$ |
| $PV201,m_V$ | $PV201,m_C$ |
| $PV202,m_V$ | $PV201,m_C$ |
| $PV203,m_V$ | $PV201,m_C$ |
| $PV204,m_V$ | $PV201,m_C$ |
| $PV205,m_V$ | $PV202,m_C$ |
| $PV206,m_V$ | $PV202,m_C$ |
| $PV207,m_V$ | $PV202,m_C$ |
| $PV208,m_V$ | $PV203,m_C$ |
| $PV209,m_V$ | $PV204,m_C$ |
| $PV210,m_V$ | $PV205,m_C$ |
| $PV211,m_V$ | $PV205,m_C$ |
| $PV212,m_V$ | $PV206,m_C$ |
| $PV213,m_V$ | $PV207,m_C$ |
| $PV214,m_V$ | $PV209,m_C$ |
| $PV215,m_V$ | $PV210,m_C$ |
| $PV216,m_U$ | $PV211,m_C$ |
| ... | ... |
| $PVN-1,m_V$ | PVMAX |
| $PVN,m_V$ | PVMAX |

| PV1,1$_H$ | PV1,2$_H$ | PV1,3$_H$ | PV1,4$_H$ | PV1,5$_H$ | PV1,6$_H$ | PV1,7$_H$ | ... | PV1,M-1$_H$ | PV1,M$_H$ |
|---|---|---|---|---|---|---|---|---|---|
| PV2,1$_H$ | | | | | | | | | |
| PV3,1$_H$ | | | | | | | | | |
| PV4,1$_H$ | | | PVn-1, m-1$_H$ | PVn-1, m$_H$ | PVn-1, m+1$_H$ | | | | |
| PV5,1$_H$ | | | PVn, m-1$_H$ | PVn, m$_H$ | PVn, m+1$_H$ | | | | |
| PV6,1$_H$ | | | PVn+1, m-1$_H$ | PVn+1, m$_H$ | PVn+1, m+1$_H$ | | | | |
| PV7,1$_H$ | | | | | | | | | |
| ... | | | | | | | | | |
| PVN-1,1$_H$ | | | | | | | | PVN-1, M-1$_H$ | PVN-1, M$_H$ |
| PVN,1$_H$ | PVN,2$_H$ | PVN,3$_H$ | PVN,4$_H$ | PVN,5$_H$ | PVN,6$_H$ | PVN,7$_H$ | ... | PVN, M-1$_H$ | PVN,M$_H$ |

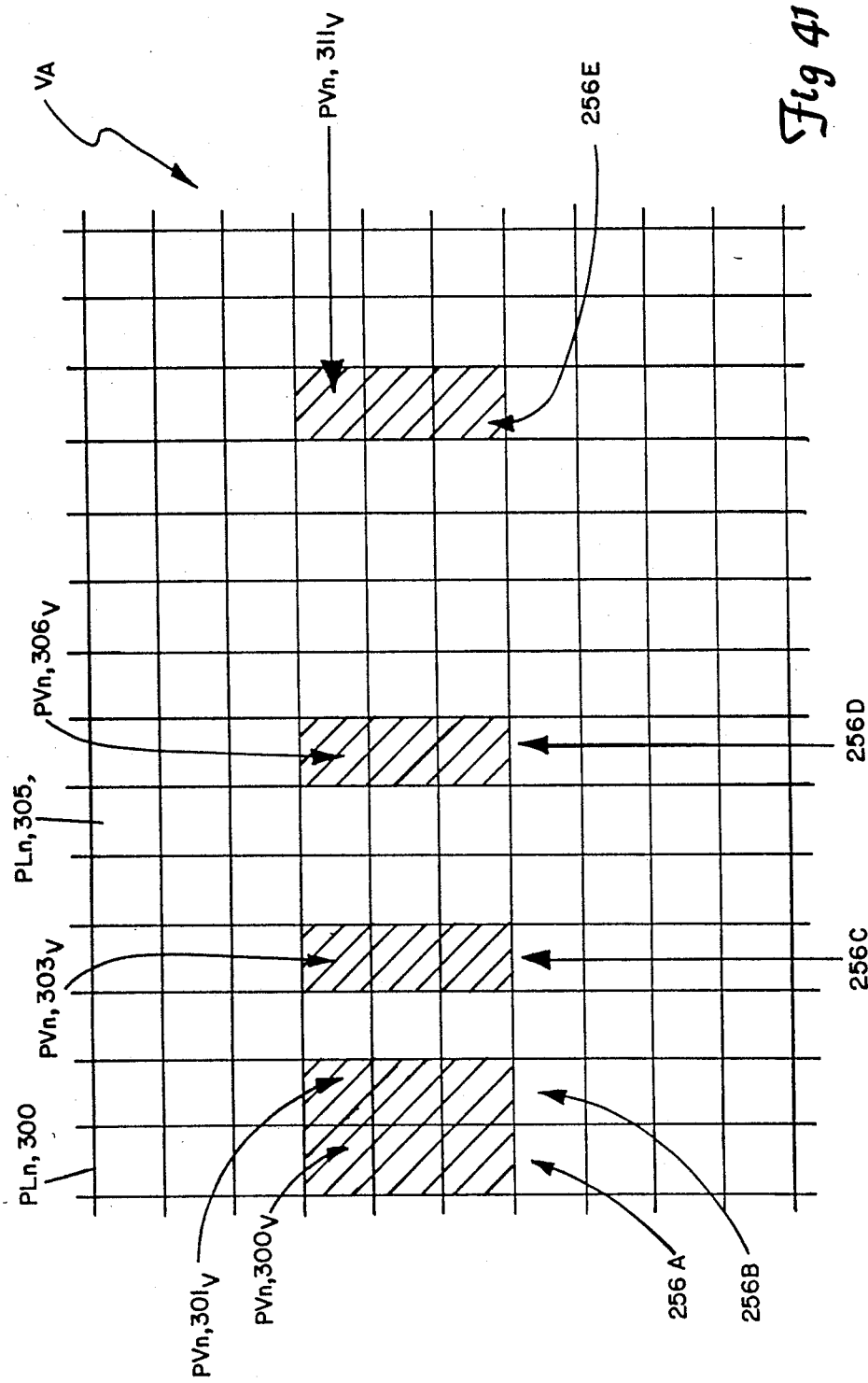

TENPRINTER Data Capture System

1. Clear system for new card.
2. Start fingerprint capture.
3. Enter/change demographic function.
4. Print card.
5. Options.

Enter number, then press RETURN key:

TENPRINTER Fingerprint Processing Choices

0. Exit.
1. Capture Prints.
2. Recapture Prints.
3. Options.

*Fig.46*

Enter number, then press RETURN key:

FIG 41

Name: Last_____ First_____ Middle_____

Date of Birth (DOB)_____ Place of Birth_____

Sex___Race___Hgt_____ Wgt____ Eyes____ Hair_____

Aliases_____ Contributor (ORI)_____

Your no. (OCA)_____ FBI no. (FBI)_____

SID no. (SID)_____ Social Security no. (SOC)_____

Today's date_____ Date Arrested or Received (DOA)_____

Charge_____ Final Disposition_____

| DEPARTMENT INFORMATION | | DEMOGRAPHIC INFORMATION | | | |
|---|---|---|---|---|---|
| R. THUMB | R. INDEX | R. MIDDLE | R. RING | R. LITTLE | |
| L. THUMB | L. INDEX | L. MIDDLE | L. RING | L. LITTLE | |
| LEFT FOUR FINGERS SIMULTANEOUSLY | | L. THUMB | R. THUMB | RIGHT FOUR FINGERS SIMULTANEOUSLY | |

OPTICAL FINGERPRINTING SYSTEM

Reference is hereby made to co-pending applications entitled OPTICAL DEVICES FOR PROVIDING FINGERPRINT IMAGES, Ser. No. 019,889 and METHODS FOR PRODUCING COMPUTER ENHANCED FINGERPRINT IMAGES, Ser. No. 020,331, both filed on even date herewith.

BACKGROUND OF THE INVENTION

1. Field of the Invention

The present invention relates to optical fingerprinting systems.

2. Description of the Prior Art

Over the years, the most commonly used technique for obtaining fingerprints has been to apply ink to the tip of individual fingers and roll the inked fingertip at an appropriate location on an applicant card to produce the "rolled" fingerprint. Plain or "slap" prints, which are the simultaneous fingerprinting of the index, middle, ring, and little fingers of a hand, are taken by inking the tips of these fingers and simultaneous pressing the inked fingertips on the applicant card at the appropriate location. While these inking procedures will usually provide satisfactory images, they have their drawbacks. The inking procedure is messy. Several attempts are often required in order to obtain an acceptable fingerprint. Perhaps even a bigger drawback of this system is that the printed images are not easily adaptable to computerized storage and processing techniques, inhibiting cooperation and fingerprint data transfer between various police agencies.

Optical fingerprinting systems which optically generate fingerprint images are also in use. Several such optical fingerprinting systems are disclosed in the Becker U.S. Pat. No. 3,482,498, McMahon U.S. Pat. No. 3,975,711, White U.S. Pat. No. 3,200,701, Schiller U.S. Pat. No. 4,544,267 and Marcus U.S. Pat. No. 4,553,387. However, for a variety of reasons, systems such as these have not gained widespread acceptance.

Due to the compound curved nature of the fingerprint on a finger, it is difficult to optically obtain an image corresponding to a rolled fingerprint. The Schiller U.S. Pat. No. 4,544,267 discloses an apparatus in which a finger pressed against a platen provides a fingerprint object which is scanned by an interrogating beam of collimated light that is linearly displaced across the platen thereby maintaining a constant angle between the interrogating light beam and the plane of the object being scanned. The Marcus U.S. Pat. No. 4,553,837 discloses finger processing apparatus which includes a cylindrical-segment platen which supports a finger. Optical scanning equipment scans the circumference of the platen in such a manner that the angle of incidence of a light beam on the fingerprint object remains constant. The Becker U.S. Pat. No. 3,482,498 discloses several embodiments of an optical apparatus for producing a rolled fingerprint image, both of which utilize a prism having a totally reflecting surface. The embodiment shown in FIG. 1a utilizes a plurality of prisms and light sources, and produces only an approximation of the ball and side ridges. The embodiment shown in FIGS. 2 and 3 utilize a mechanical system actuated by a rolling finger to move and position a light source.

While the fingerprinting systems disclosed in the Schiller and Marcus patents, and the second embodiment disclosed in the Becker patent, may be capable of optically providing a rolled fingerprint image, these systems are less than wholly desirable. Perhaps most important, it is not possible to review the image being captured in real-time to determine whether or not critical information required for classification is being captured. Furthermore, the mechanical aspects of these systems, are relatively complicated. As a result, maintaining focus during the time required to obtain the entire rolled fingerprint image can be difficult. Although the fingerprint image produced by the first embodiment of the invention disclosed in the Becker patent provides an image in real-time, this image only approximates the rolled fingerprint image.

Prisms such as those disclosed in the McMahon U.S. Pat. No. 3,975,711 and the White U.S. Pat. No. 3,200,701 utilize the optical principle of total internal reflection to produce a fingerprint image. As such, the "plane" of the fingerprint must be imaged at an observation angle which is not perpendicular to the plane. Vertical scale errors, or distortions of distances on the fingerprint image from their true distances along a Y-axis which is generally parallel to a longitudinal axis of the finger, are therefore inherent. When the surface of the prism on which the finger is inserted is grooved as illustrated in the McMahon patent, horizontal scale errors which are distance distortions on the fingerprint image from true distances along a X-axis generally perpendicular to the longitudinal axis of the finger on the fingerprint, are also inherent. Furthermore, curvature errors are also produced. As a result of the vertical and horizontal scale errors, and the curvature errors inherent in the use of a grooved total internal reflection prism such as that shown in McMahon, the fingerprint image provided thereby is severely distorted from a true rolled fingerprint of the same finger.

Prisms which have grooved finger receiving surfaces such as those disclosed in the McMahon patent will not provide optimum surface contact between the surface of a finger and therefore its fingerprint, and the prism. Portions of the fingerprint which it may be desired to obtain will therefore be lost. Illumination of the fingerprint through prisms such as that shown in the McMahon patent is often unequal, resulting in an image which has varying intensities throughout its area. Furthermore the contrast between ridges and valleys in the fingerprint image produced by these prisms is generally relatively low.

Many police departments including the FBI require both plain or slap fingerprint images and individual rolled fingerprint images as part of their standard fingerprinting process. Prior art optical fingerprinting systems, however, are incapable of optically generating both individual rolled fingerprints and slap fingerprint images.

It is evident that there is a continuing need for improved optical fingerprinting systems. A system having the capability of capturing both slap and rolled fingerprint images would be especially desirable. An operator should be able to easily interface with the system, and observe in real-time the quality of the fingerprint image before it is captured. A system which can capture fingerprints from fingers of varying sizes would also be useful.

It is also evident that there is room for improvement in the prisms utilized by optical fingerprinting systems. Grooves in these prisms should be contoured in a manner which permits optimum contact between the fingerprint and grooved surface. A prism which can capture slap fingerprint images is also needed. A prism which reduces horizontal and vertical scale errors, as well as curvature errors, would also be welcomed. Furthermore, a prism which produces a high contrast fingerprint image is also needed. Other techniques which can correct for vertical and horizontal scale errors, and curvature errors so as to produce an enhanced fingerprint image would also be desirable properties of an optical fingerprinting system.

SUMMARY OF THE INVENTION

The present invention is an optical fingerprinting system which includes slap print prism means and individual finger prism means. The slap print prism means receives a plurality of fingers and provides an optical slap fingerprint image. The individual finger prism means has a finger-receiving groove for receiving an individual finger, and provides an optical individual fingerprint image. Sensor means image the fingerprint images and provide fingerprint information representative of the images. Slap/individual fingerprint selection means selectively cause the slap fingerprint image from the slap print prism means or the individual fingerprint image from the individual finger prism means to be propagated to the sensor means. Memory means coupled to the sensor means store the fingerprint information representative of the imaged fingerprint image.

In a preferred embodiment, the slap/individual fingerprint image selection means includes optics mounting means movable between a slap fingerprint select position and an individual fingerprint select position. Slap fingerprint image propagation optics at least partially mounted to the optics mounting means propagate the slap fingerprint image from the slap print prism means to the sensor means when the optics mounting means is positioned at the slap fingerprint select position. Individual fingerprint image propagation optics at least partially mounted to the optics mounting means propagate the individual fingerprint image from the individual finger prism means to the sensor means when the optics mounting means is positioned at the individual fingerprint select position. The optics mounting means can be driven between the slap fingerprint select position and individual fingerprint select position by a motor.

In another embodiment, the optical fingerprinting system includes prism means having a finger-receiving surface for receiving a finger and for providing an optical fingerprint image of the finger. The fingerprint image is imaged by video means. Digitizer means coupled to the video means provide digital fingerprint data representative of the image. The fingerprint data is then stored at indexed locations by fingerprint memory means. Capture key means responsive to operator actuation provide fingerprint capture signals when a fingerprint image is to be captured. Processor means coupled to receive the fingerprint capture signals from the capture key means and coupled to the memory means cause fingerprint data to be stored at indexed locations in the fingerprint memory means in response to operator actuation of the capture key means. A visual display indicating from which of a thumb, index, middle, ring and little fingers of a left and right hand that a fingerprint image should be captured is provided by display means coupled to the processor means.

Preferred embodiments of the system also include demographic memory means coupled to the processor means for storing demographic information entered through keyboard means. Demographic prompt means coupled to the processor means prompt an operator to enter demographic information about the person being fingerprinted, and cause the entered demographic information to be stored in the demographic memory means. The fingerprint images and demographic information can be printed at predetermined locations on a document. The display means includes a left and hand-shaped indicia having a thumb, index, middle, ring and little finger. Thumb, index, middle, ring, and little finger indicator means associated with the thumb, index, middle, ring and little fingers of the hand-shaped indicia, respectively, provide a visual display indicating the finger from which a fingerprint image should be captured.

The optical fingerprinting system of the present invention permits police departments to quickly, conveniently, and accurately fingerprint suspects. Both slap and individual fingerprints can be taken and printed at proper locations on a booking card. Demographic information about the suspect being fingerprinted is also printed at proper locations on the booking card. Operators can easily interface with this system utilizing its prompts and display features.

BRIEF DESCRIPTION OF THE DRAWINGS

FIG. 3A is a side view of the optics subsystem shown in FIG. 2, illustrating the optical propagation of fingerprint images from the finger prism to the camera when the slap/image selection optics is positioned at its finger image position.

FIG. 3B is a side view of the optics subsystem shown in FIG. 2 illustrating the optical propagation of fingerprint images from the slap prism to the camera when the slap/image selection optics is positioned at its slap image position.

FIG. 4 is a detailed perspective view of the lens trolley shown in FIG. 2.

FIG. 6 is a perspective view of an individual finger prism shown in FIG. 2.

FIG. 7 is a sectional view of the finger prism shown in FIG. 6.

FIG. 8 is a rear view of the finger prism shown in FIG. 6.

FIG. 9 is a side view of the finger prism shown in FIG. 6.

FIG. 10 is a top view of the finger prism shown in FIG. 6.

FIG. 11 is a bottom view of the finger prism shown in FIG. 6.

FIG. 15 is a graphic representation of a finger illustrating various characteristics of a fingerprint thereon.

FIG. 16 is a perspective view of an alternative embodiment of the slap print prism shown in FIG. 2.

FIG. 17 is a side view of the slap print prism shown in FIG. 16.

FIG. 21 is a graphic representation of an image array of image pixel values generated by the frame digitizer shown in FIG. 20.

FIG. 23 is a graphic representation of an illumination equalized array of illumination equalized pixel values generated by the processor subsystem shown in FIG. 20.

FIG. 25 is a graphic representation of a directional filtered array of directional filtered pixel values produced by the processor subsystem shown in FIG. 20.

FIG. 27 is a detailed graphic representation of an illumination equalized array such as that shown in FIG. 26, illustrating the regular and offset subarrays utilized by the processor subsystem shown in FIG. 20 to produce the directional filtered array.

FIG. 29 is a graphic representation of an unhaired array of unhaired pixel values produced by the processor subsystem shown in FIG. 20.

FIG. 31 is a graphic representation of a curvature corrected array of curvature corrected pixel values generated by the processor subsystem shown in FIG. 20.

FIG. 38 is a graphic representation of a table of vertical scale correction data generated by the processor subsystem from the curvature corrected array shown in FIG. 37, and used to generate a vertically scaled array.

FIG. 39 is a graphic representation of a horizontally scaled array of horizontally scaled pixel values generated by the processor subsystem shown in FIG. 20.

FIG. 40 is a graphic representation of a table of horizontal scale correction data generated by processor subsystem from the image of the pattern of indicia shown in FIG. 32 and used to produce the vertically scaled array shown in FIG. 39.

FIG. 41 is a graphic representation of a vertically scaled array representative of the image of the pattern of indicia shown in FIG. 32.

FIG. 42 is an illumination of a Main Display menu generated and displayed by the data terminal shown in FIG. 1.

FIG. 43 is a detailed view of the display on the optics/processor unit shown in FIG. 1.

FIG. 45 is an illustration of a Demographic/Department Information menu generated and displayed by the data terminal shown in FIG. 1.

FIG. 46 is an illustration of a Processing Choices menu generated and displayed by the data terminal shown in FIG. 1.

FIG. 47 is a graphic representation of a booking or applicant card onto which fingerprint images, department information and demographic information can be printed by the printer shown in FIG. 1.

DETAILED DESCRIPTION OF THE PREFERRED EMBODIMENTS

Overall System and Optics Subsystem Description

Figure 1:
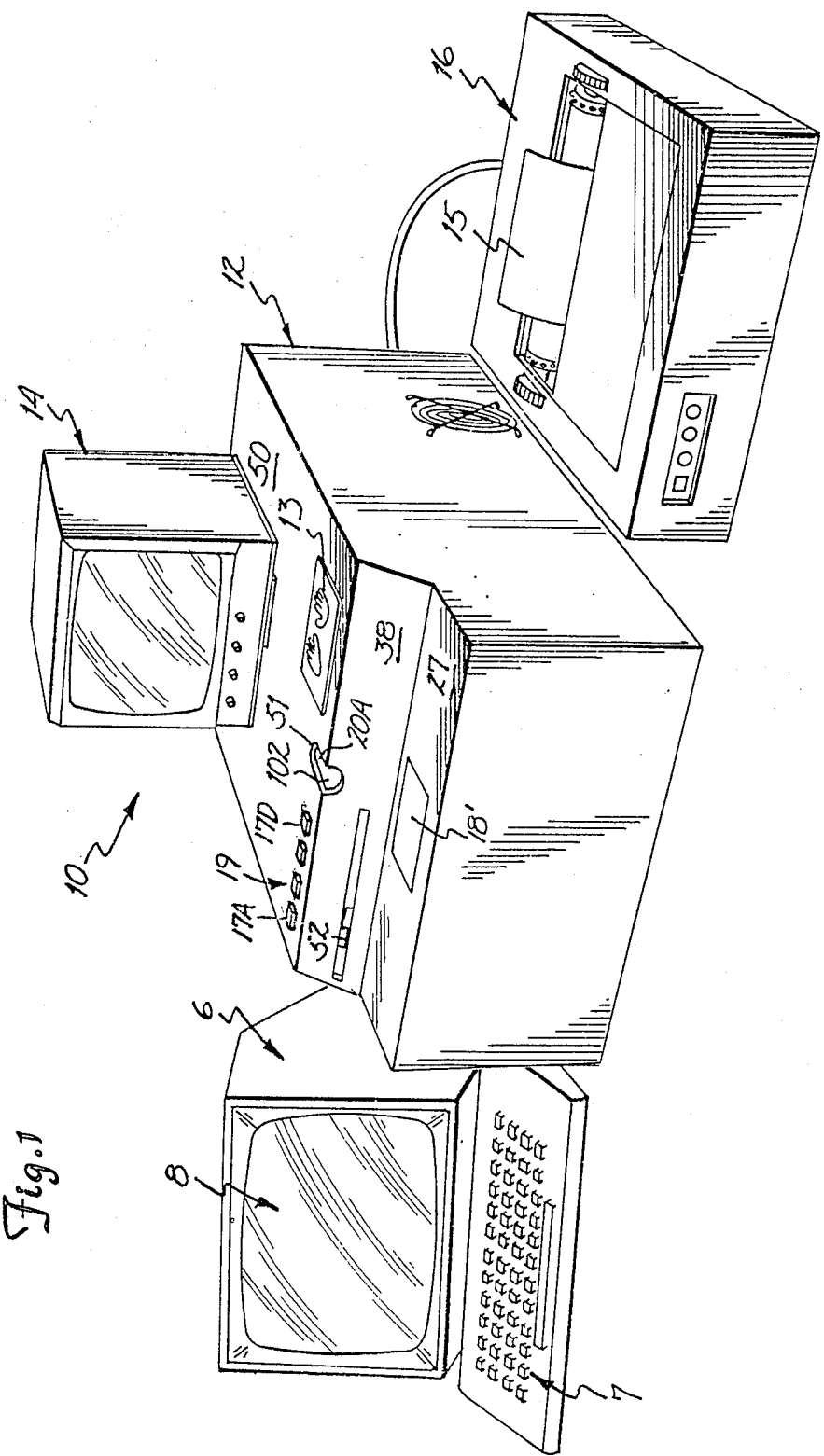
FIG. 1 illustrates elements of an optical fingerprinting system in accordance with the present invention.

An optical fingerprinting system 10 in accordance with the present invention is illustrated generally in FIG. 1. As shown, fingerprinting system 10 includes an optics/processor unit 12, video monitor 14, printer 16, and data terminal 6, which includes a keyboard 7 and monitor 8. Data terminal 6, monitor 14 and printer 16 are interfaced to optics/processor unit 12. Fingerprinting system 10 is capable of providing printed records of both plain or "slap" prints which are simultaneous impressions of the fingerprints of all fingers of a hand other than the thumb, and individual fingerprints.

To take a slap print, the person to be fingerprinted will position the fingertips of their index, middle, ring and little fingers on the slap print prism 18'. Optics/processor unit 12 images the slap print and provides a real-time visual display thereof on monitor 14. When an operator observes a satisfactory slap print image on monitor 14, a key 17A–17D on key pad 19 is actuated causing optics/processor unit 12 to "freeze" the image by storing digital data representative thereof. This image is then enhanced when the digital data is processed by optics/processor unit 12 in accordance with image enhancement software. Data representative of the enhanced image is then stored. If it is desired to fingerprint an individual finger, the person to be fingerprinted will position their finger within groove 102 of an individual finger prisms such as 20A. Optics/processor unit 12 will image the fingerprint, and provide a display thereof on monitor 14. This image can then be "frozen", and data representative thereof processed by optics/processor unit 12 and stored.

Demographic data characteristic of the person being fingerprinted and department data (or other relevant information) utilized by the organization doing the fingerprinting can be entered into system 10 by the operator through keyboard 7. This data, along with the stored fingerprint images, can then be printed at proper locations on a document such as a standard booking or applicant card 15 by printer 16. These procedures are all facilitated by system generated means and prompts which are displayed on monitor 8 of data terminal 6, as well as by display 13 and illumination of buttons 17A-17D of key pad 19.

Figure 2:
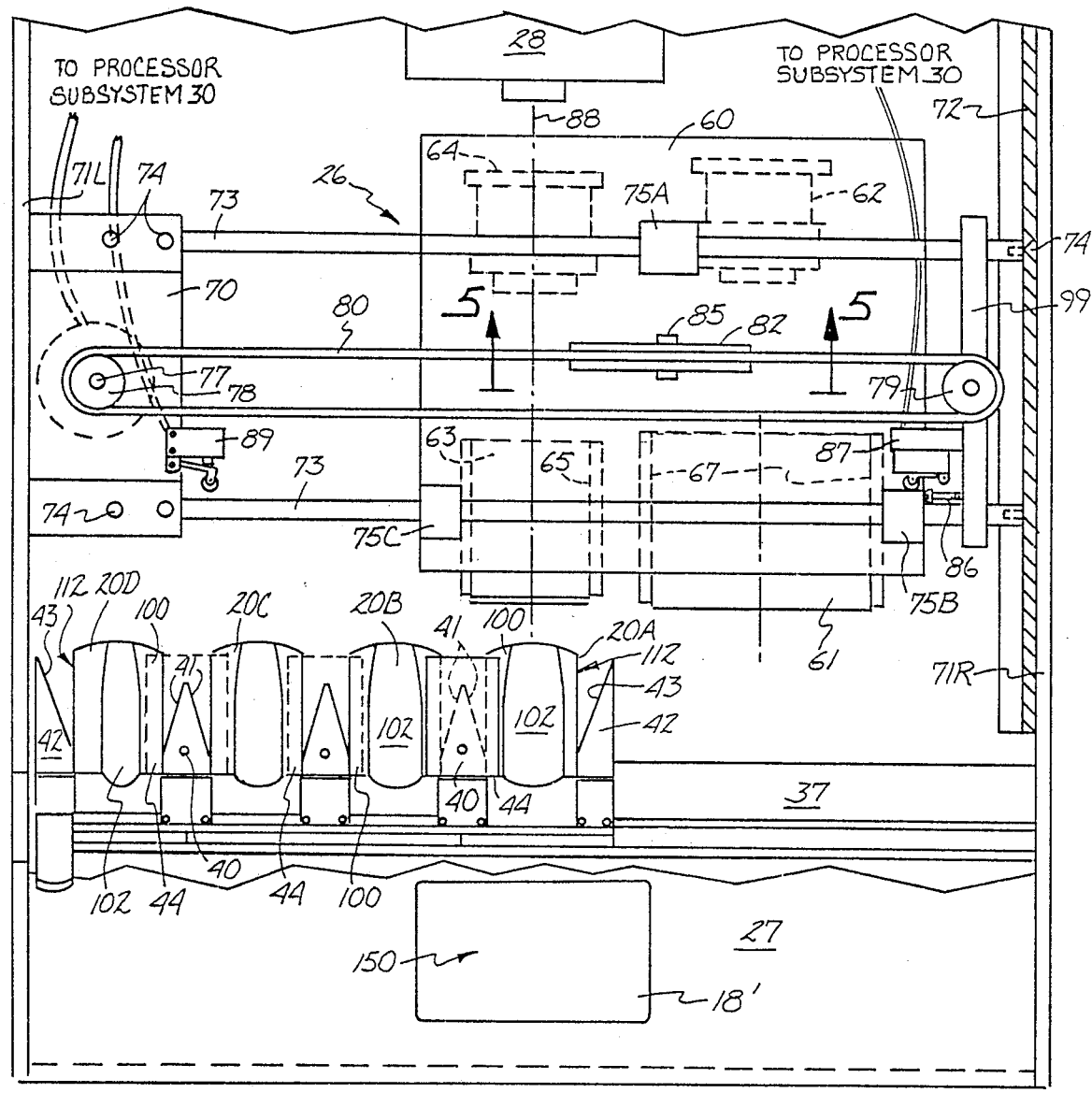
FIG. 2 is a view looking into the top of the optics/processor unit shown in FIG. 1.

An optics subsystem 22 within optics/processor unit 12 is illustrated in greater detail in FIGS. 2, 3A and 3B. Optics subsystem 22 includes slap print prism 18', finger prism trolley 24, first slap image mirror 25, slap/finger image selection optics 26, and a sensor such as video camera 28. Slap print prism 18' is mounted in such a manner that its finger-receiving surface 150 is generally level and coplanar with a stepped top panel 27 of unit 12. First slap image mirror 25 is mounted with respect to slap print prism 18' so as to receive slap fingerprint images projected from image projection surface 156 of the prism, and to reflect these images to slap/finger image selection optics 26. Slap print prism 18' is illuminated by means of a light source such as lamp 31 which is positioned adjacent to a light-receiving surface 162 of the prism. In the embodiment shown, lamp 31 is a sideways oriented U-shaped fluorescent bulb having two legs which are shown in cross section. The two legs of lamp 31 extend across light-receiving surface 162 of prism 18', and are surrounded on a side opposite prism 18' by reflector 32.

Finger prism trolley 24, which is illustrated in greater detail in FIG. 4, includes a base 34 to which a plurality of individual finger prisms 20A-20D are mounted by screws or other suitable fasteners (not shown). Base 34 includes a track-follower section 36 which is slidably received upon a guide track 37. Guide track 37, in turn, is mounted with respect to a sloping front panel 38 of unit 12 by means of a mounting bracket 39. As shown in FIGS. 2 and 4, each finger prism 20A-20D has an upper surface 100 which includes a finger-receiving groove 102. Prisms 20A-20D are spaced from one another by triangular shaped mirror blocks 40 which have reflective or mirror side surfaces 41 which angle away from side surfaces 112 of prisms 20A-20D and intersect at a point toward slap/finger image selection optics 26. End mirror blocks 42 are positioned adjacent side surfaces 112 of prisms 20A and 20D which are opposite mirror blocks 40. End mirror blocks 42 also have a reflective side surface 43 which angles away from side surfaces 112 in a direction toward slap/finger selection optics 26. Mirror blocks 40 have their top surface covered by cover plates 44 (some of which are shown in phantom in FIG. 2) which extend between adjacent prisms 20A-20D.

Finger prism trolley 24 is mounted with respect to unit 12 at an angle in such a manner that finger-receiving grooves 102 of prisms 20A-20D are generally parallel with top panel 50 of the unit. As perhaps best shown in FIGS. 1, 3A and 3B, a finger-receiving cutout or aperture 51 extends through top panel 50 and sloping side panel 38 at a position adjacent trolley 24 to expose groove 102 of one of prisms 20A-20D. By means of trolley handle 52 which extends through panel 38, an operator can slide trolley 24 along guide track 37 in such a manner as to position groove 102 of a desired finger prism 20A-20D adjacent aperture 51. A lamp 53, which can be identical to lamp 31 previously described, is mounted with respect to unit 12 below aperture 51 and adjacent a light-receiving surface 104 of whichever prism 20A-20D has been positioned adjacent aperture 51. Light from lamp 53 will directly enter light-receiving surface 104, and be reflected by surfaces 41 and 43 of mirror blocks 40 and 42, respectively, into side walls 112 of the selected finger prism 20A-20D. A fingerprint image of a finger positioned within groove 102 of the selected prism 20A-20D will thereby be propagated from image propagation surface 106 toward slap/finger image selection optics 26.

Slap/finger image selection optics 26 includes a mounting plate 60 which has a second slap image mirror 61 and a slap image focusing lens assembly 62, as well as a finger image mirror 63 and finger image focusing lens assembly 64 mounted to a lower side thereof. Finger image mirror 63 is mounted to mounting plate 60 by means of mounting brackets 65, and is oriented at an angle so as to receive fingerprint images propagated from one of finger prisms 20A-20D and to reflect the fingerprint image to a lens (not separately visible) within finger image focus lens assembly 64. Lens assembly 64 is mounted to mounting plate 60 by means of mounting bracket 66. Second slap image mirror 61 is mounted to mounting plate 60 by mounting brackets 67 at a position adjacent finger image mirror 63. Mirror 61 is oriented at such an angle as to receive slap print images from first slap image mirror 25, and to reflect these images to a lens (not separately visible) within lens assembly 62. Lens assembly 62 is mounted to mounting plate 60 by means of mounting bracket 68. The lenses within lens assemblies 62 and 64 can be adjustably positioned along their optical axis to facilitate optical focusing adjustments of subsystem 22.

As shown in FIG. 2, a motor mounting bracket 70 is mounted to a left side panel 71L of unit 12, while a support bracket 72 is mounted to right side panel 71R. Mounted to and extending between brackets 70 and 72 is a pair of guide rods 73. Guide rods 73 are mounted to brackets 70 and 72 by means of fasteners 74 in the embodiment shown. Mounting plate 60 is slidably suspended from guide rods 73 by means of slide bushings 75A-75C.

A motor 76 which is interfaced to processor subsystem 30 is mounted to a lower face (not visible) of mounting bracket 70, and has a drive shaft 77 which extends through the bracket. A drive wheel 78 is mounted to shaft 77. An idler wheel 79 is rotatably mounted to an idler bracket 99. Idler bracket 99 is mounted across guide rods 73.

Looped between drive wheel 78 and idler wheel 79 is a drive belt 80.

Figure 5:
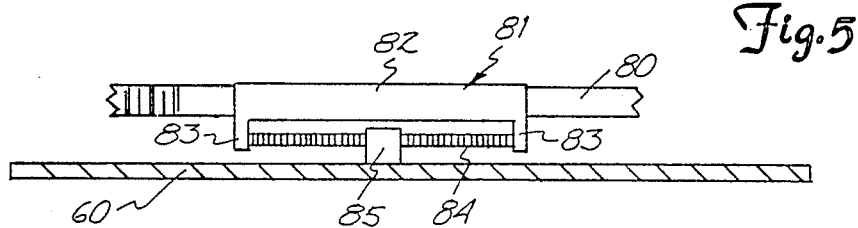
FIG. 5 is a detailed view of the fastening assembly shown in FIG. 2.

A flexible fastening assembly 81 for flexibly fastening belt 80 to mounting plate 60 is illustrated in FIG. 5. Fastening assembly 81 includes a clamp 82 which has a slot (FIG. 2) into which drive belt 80 is fixedly clamped. Clamp 82 also has a pair of downward extending arms 83 on its opposite sides. Ends of a flexible member such as stretched spring 84 are fastened to arms 83. A central portion of spring 84 is fastened to mounting plate 60 by means of clamp or bracket 85.

Motor 76 is interfaced to a processor subsystem 30 of optics/processor unit 12. In response to finger prism select signals from processor subsystem 30, motor 76 will rotate in a clockwise direction as viewed in FIG. 2, thereby driving mounting plate 60 (slap/finger image selection optics 26) along guide rods 73 to a rightmost or finger prism select position illustrated in FIGS. 2 and 3A. Mounting plate 60 is driven in this manner until slide bushing 75B is positioned against adjustable stop 86 and actuates microswitch 87. Microswitch 87 is interfaced to processor subsystem 30, and provides signals representative of the positioning of mounting plate 60 to the finger prism select position.

With slap/finger image selection optics 26 in the finger prism select position, video camera 28, finger prism focus lens assembly 64, and finger image mirror 63 are all aligned with the finger prism 20A-20D with has been positioned adjacent aperture 51. Visual images of fingerprints of fingers positioned with groove 102 will thereby be propagated from image propagation surface 106 of the selected prism 20A-20D along finger image optical path 88, reflected by mirror 63, focused by the lens within assembly 64, and imaged by camera 28.

In response to slap print prism select signals from processor subsystem 30, motor 76 will rotate in a counterclockwise direction, thereby pulling mounting plate 60 and slap/finger image selection optics 26 to a slap print select or leftmost position (not shown) when viewed from FIG. 2. Slide bushing 75C will then actuate microswitch 89, which in turn provides slap print positioning select signals to processor subsystem 30. Processor subsystem 30 then stops rotation of motor 76.

Figure 44:
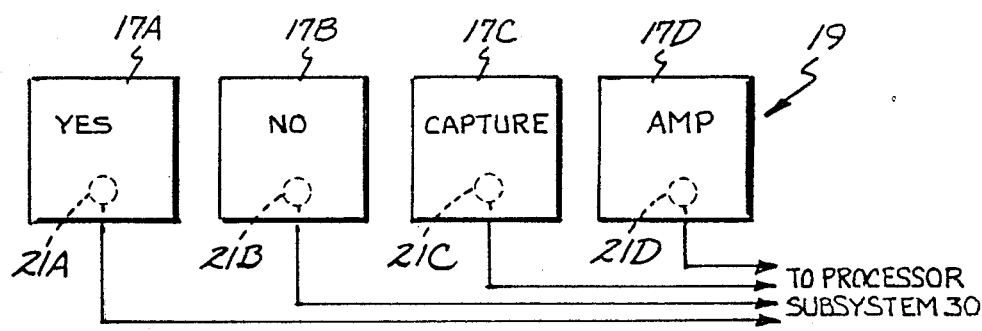
FIG. 44 is a detailed view of the key pad on the optics/processor unit shown in FIG. 1.
Figure 20:
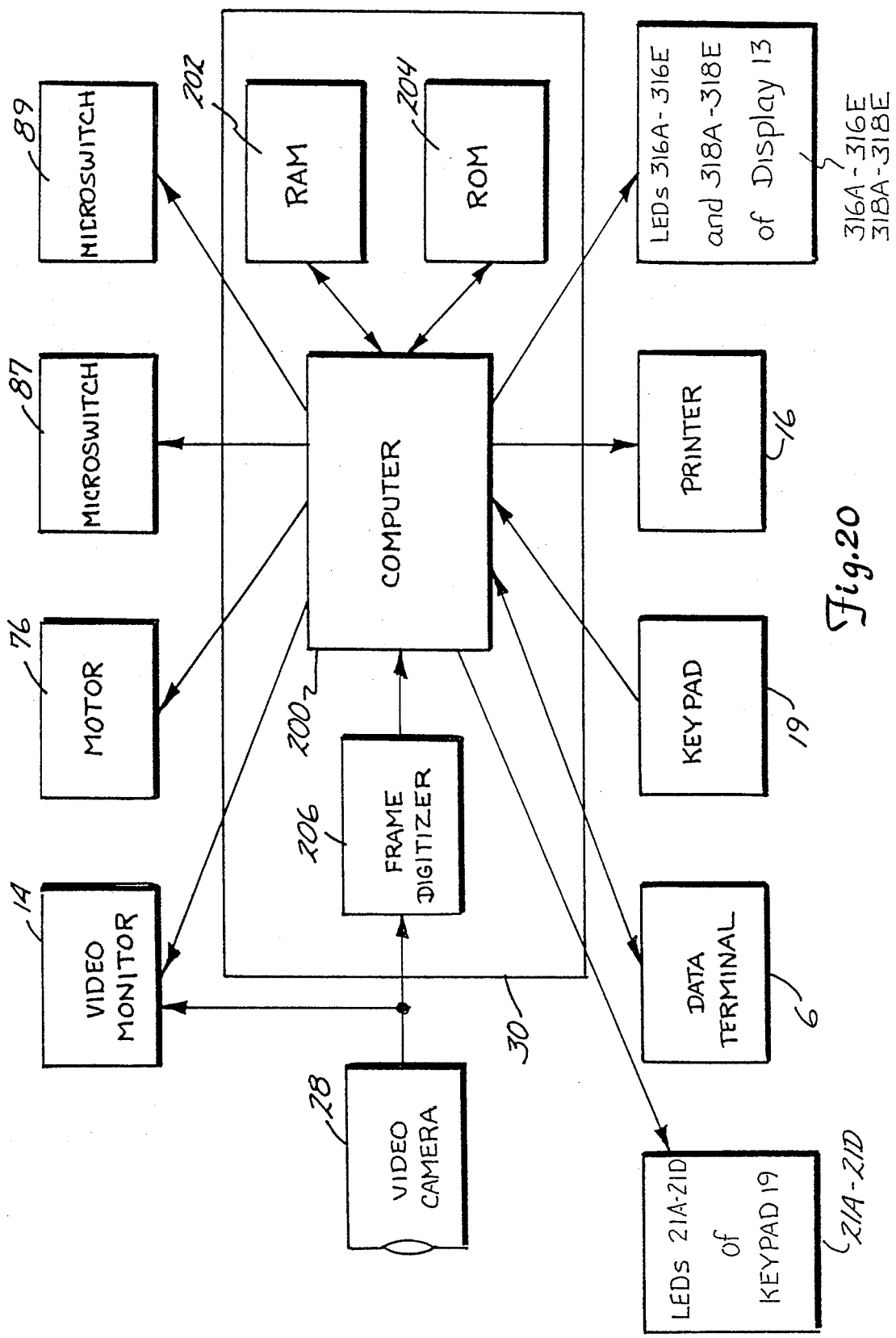
FIG. 20 is a block diagram representation of the processor subsystem of the optics/processor unit shown in FIG. 1, and illustrating its interconnection to other electrical elements of the fingerprinting system.

As illustrated in FIG. 3B, when selection optics 26 are properly positioned inthes slap print select position, second slap image mirror 61 and slap print focusing lens assembly 62 will be aligned about a slap print optical path 90 between slap print prism 18', first slap image mirror 25, and camera 28. Slap print images of fingers positioned on slap print prism 18' will thereby be propagated from image propagation surface 156 of the prism along slap print optical path 90, reflected by mirrors 25 and 61, focused by the lens within assembly 62, and imaged by camera 28. Video signals representative of fingerprint images imaged by camera 28 are provided to processor subsystem 30. Key pad 19 is illustrated in FIGS. 1, 20, and 44. As perhaps best illustrated in FIG. 44, key pad 19 is formed by a YES key 17A, a NO key 17B, a CAPTURE key 17C, and an amputee or AMP Key 17D. Keys 17A-17D are preferably fabricated of a translucent material such as plastic, and have a light source such as LEDs 21A-21D, respectively, positioned thereunder. LEDs 21A-21D are each individually interfaced to processor subsystem 30 as shown, and can be individually lit or illuminated by the processor subsystem.

Display 13 is illustrated in greater detail in FIG. 43. As shown, display 13 includes a left hand representation or indicia 312, and a right hand indicia 314. Each finger of indicia 312 and 314 have a light such as LEDs 316A-316E and 318A-318E associated therewith. In the embodiment illustrated in FIG. 43, LEDs 316A-316E are positioned in the thumb, index, middle, ring, and little fingers of left hand indicia 312. Leds 318A-318E are positioned in the thumb, index, middle, ring and little fingers of right hand indicia 314. Leds 316A-316E and 318A-318E are each interfaced (FIG. 20) individually to processor subsystem 30 so as to be capable of individual illumination thereby.

Individual Finger Prisms

Individual finger prism 20A, which is representative of individual finger prisms 20A-20D, is perhaps best described with reference to FIGS. 6-11. Prism 20A is an optical device fabricated of light-propagating material such as plastic which is characterized by an index of refraction. In one embodiment, prisms 20A-20D are machined from acrylic polymer, although they can also be molded from this or other materials.

As shown, prism 20A has a first or sloping upper surface 100 which has a finger-receiving groove 102 therein, and a front face which includes both a second or light-receiving surface 104 and a third or image propagation surface 106. Prism 20A also includes a fourth or bottom surface 108, a fifth or back surface 110, and two side faces or surfaces 112.

Prism 20A has a width of dimension D1, and an overall depth of dimension D2. Back surface 110 is perpendicular to bottom surface 108 and extends to a height of dimension D3 from the bottom surface. Upper surface 100 intersects back surface 110 at an angle A1 with respect to bottom surface 108. Light-receiving surface 104 extends perpendicularly from bottom surface 108 to a height of dimension D4. The magnitude of angle A1 will depend upon the index of refraction of the material from which prism 20A is manufactured. In one preferred embodiment in which prism 20A is manufactured of acrylic polymer, angle A1 is 35°. In this same embodiment, dimensions D1-D4 are 1.58 inches, 2.35 inches, 1.62 inches, and 0.95 inches, respectively.

As shown in FIGS. 6, 7, 8, and 10, groove 102 is elongated and contoured to receive a finger. Groove 102 include both a fingerbody portion 113 and a fingertip portion 114. Fingerbody portion 113 and fingertip portion 114 of groove 102 both include a bottom wall 116 and side walls 118. As best shown in FIG. 7, the deepest part of bottom wall 116 of fingerbody portion 113 is at a constant depth of dimension D8 with respect to upper surface 100. The deepest part of bottom wall 116 of fingertip portion 114 slopes from its intersection with fingerbody portion 113 toward upper surface 100 at an angle A5 (45° in one embodiment) with respect to bottom surface 108. In the embodiment shown in FIG. 7, bottom wall 116 curves between portions 113 and 114 at a radius of curvature defined by dimension D6. In one preferred embodiment, dimension D6 is a 2.00 inch radius of curvature. This radius of curvature (dimension D6) is centered at a point displaced from the interaction of upper surface 100 and back surface 110 by length of dimension D7. Following the embodiment described above, dimension D8 is 0.50 inches while dimension D7 is 0.72 inches.

As perhaps best shown in FIG. 5, bottom wall 116 of groove 102 is semicircular having a radius of curvature characterized by dimension D8. This radius of curvature (dimension D8) can be constant throughout the length of groove 102. Side walls 118 are preferably planar, and form an angle A2 with respect to side surfaces 112 which are perpendicular to both upper surface 100 and bottom surface 108 of prism 20A. In one preferred embodiment, angle A2 is 22½°.

The above-described characteristics of groove 102 have been found to permit the highest or optimum degree of contact between a finger (not shown in FIGS. 6-11) and the various surfaces of the groove. This feature is especially important for fingertip portion 114 of groove 102 so that an image of the largest possible area of the fingerprint on the tip of a finger is propagated from prism 20A. Dimensions D6, D7 and D8, as well as angle A2, will of course vary depending upon the size of the finger to be received by groove 102. As shown in FIGS. 2 and 4, the size of grooves 102 of each prism 20A-20D on trolley 24 is different so that a prism having a properly sized groove 102 can be selected as needed for the particular finger of a particular person being fingerprinted. In general, the larger the finger being fingerprinted, the larger the groove 102 of the selected prism 20A-20D. Dimension D1 of prism 20A will of course also have to increase for prisms 20A-20D with larger grooves 102 (dimension D8).

In the embodiment of prism 20A shown in FIGS. 6-11, image propagation surface 106 and light-receiving surface 104 are both curved so as to function as lenses. Light-receiving surface 104 forms a cylindrical lens and has a radius of curvature defined by dimension D9. This radius of curvature (dimension D9) is centered about a point of dimension D½ from side surfaces 112, and spaced from back surface 110 by a distance of dimension D10. In the embodiment of prism 20A described above, dimension D9 is 1.88 inches while dimension D10 is 0.25 inches. The radius of curvature or dimension D9 of lensed light-receiving surface 104 is therefore perpendicular to back surface 110 and parallel to bottom surface 108. Alternatively, light-receiving surface 104 can be characterized as being cylindrically curved about an imaginary vertical axis 105 which is perpendicular to bottom surface 108 and parallel to back surface 110.

Image propagation surface 106 is formed as a spherical convex lens in the embodiment shown, and has a radius of curvature of dimension D11 in both horizontal (X) and vertical (Y) directions. In the embodiment of prism 20A illustrated in FIGS. 6-11, radius of curvature or dimension D11 is centered at a distance of dimension D3 from bottom surface 108, halfway about back surface 110 (D½) and a distance of dimension D10 from back surface 110. In the embodiment described above, dimension D11 is 2.00 inches.

To increase the contrast of fingerprint images provided by or propagated from prism 20A, various surfaces are coated by an opaque substance to inhibit transmission of light. In the embodiment shown, bottom surface 108, back surface 110, and planar portions of upper surface 100 other than those of groove 102 are coated with an opaque substance. In addition, portions of side surfaces 112 adjacent back surface 110 (those portions at which mirror blocks 40 or 42 meet prisms 20A-20D as shown in FIG. 2) are also coated. Black paint can be applied to the above-identified surfaces to prevent transmission of light through absorption.

Figure 13:
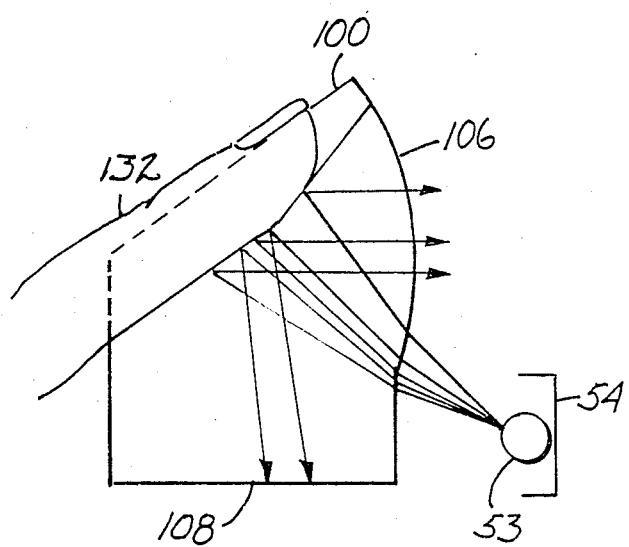
FIG. 13 is a graphic representation of the optical properties of the prism shown in FIG. 6, when a finger is positioned within its groove.
Figure 12:
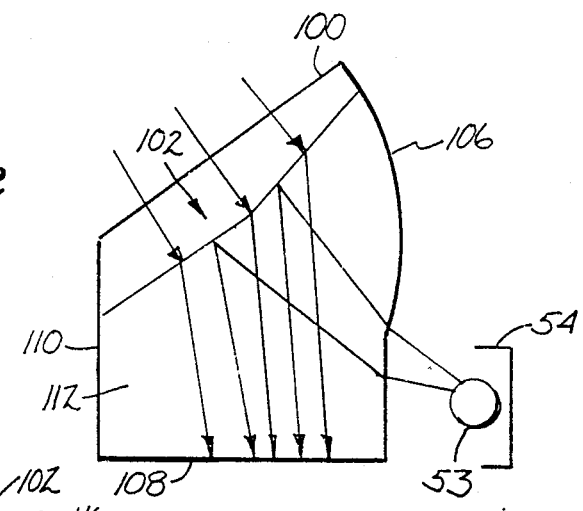
FIG. 12 is a graphic representation of the optical properties of the finger prism shown in FIG. 6, when a finger is not positioned within its groove.
Figure 14:
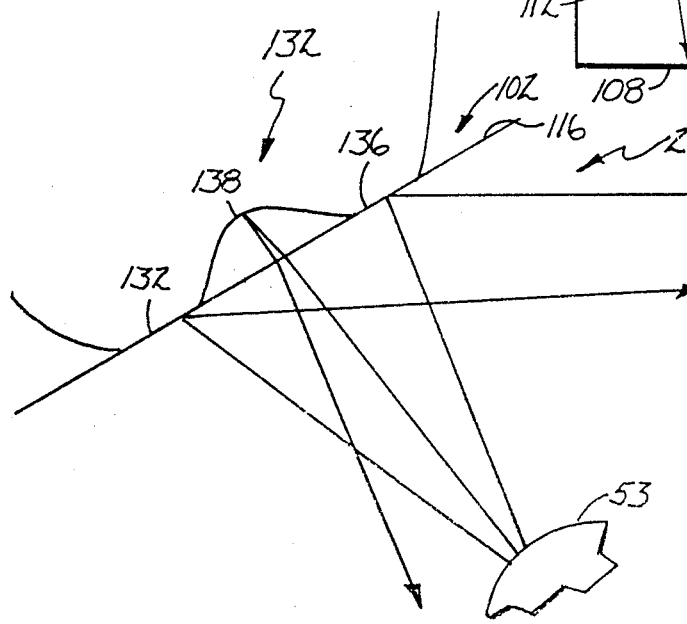
FIG. 14 is a detailed view of a portion of the prism and finger shown in FIG. 13, graphically illustrating the optical properties of the prism in conjunction with a finger positioned thereon.
Figure 18:
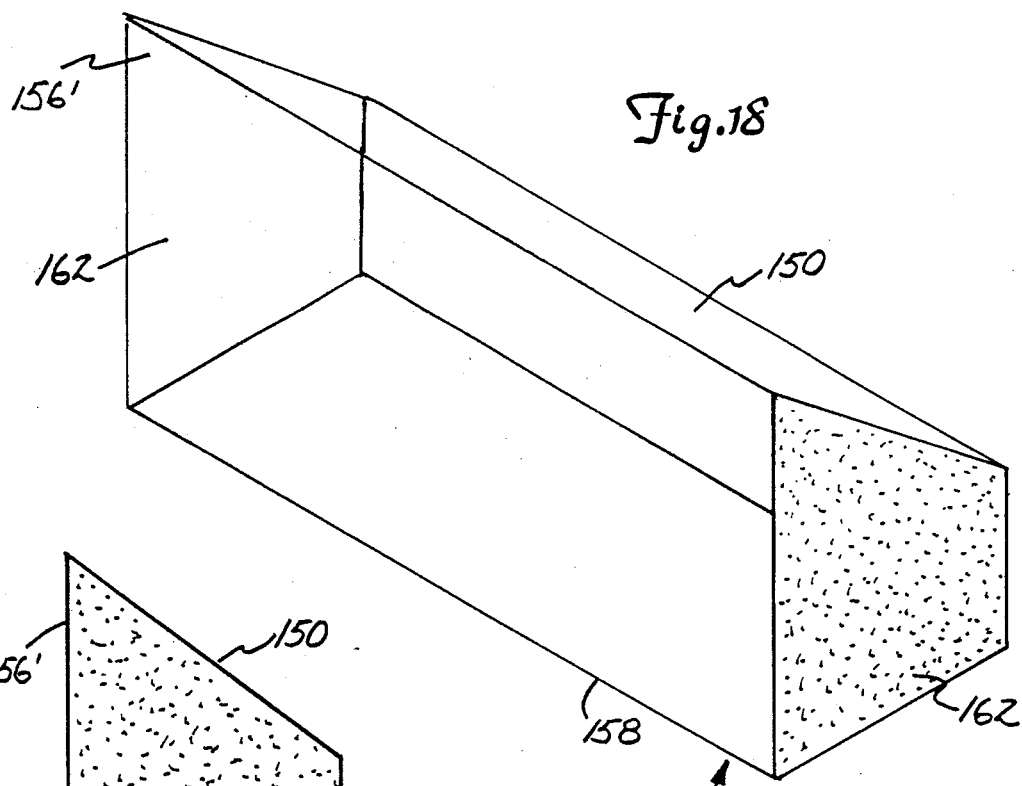
FIG. 18 is a perspective view of the slap print prism shown in FIG. 2.
Figure 19:
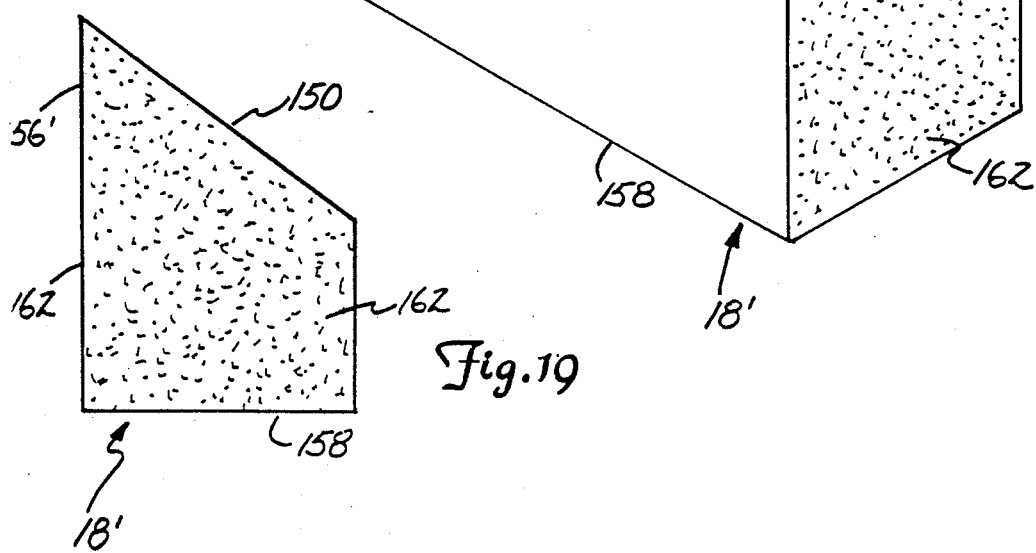
FIG. 19 is a side view of the slap print prism shown in FIG. 18.

The optical properties of prism 20A (which are similar to those of prisms 20A-20D) are described with reference to FIGS. 12-14. Prism 20A is designed to utilize the optical principal of frustration of total internal reflection. Due to the relative indexes of refraction of air and the material of which the prism 20A is constructed, and the angles of upper surface 100 and surfaces 116 and 118 of groove 102 with respect to image propagation surface 106 and light-receiving surface 104, all light incident upon groove 102 when a finger is not present thereon is refracted downward toward bottom surface 108 or sideways toward side surfaces 112 upon its entry into prism 20A as illustrated in FIG. 12. Most importantly, virtually none of the light entering groove 102 will be directed out of image propagation surface 106. Virtually all of the light which strikes bottom surface 108 or the opaque portions of side surfaces 112 is absorbed due to the opaque coating, and not re-reflected.

Light from lamp 53 will enter prism 20A through light receiving surface 104, image propagation surface 106, and portions of side faces 112 which are not coated with opaque material. Light so entering which impinges upon groove 102 will either pass through the groove and exit prism 20A, or be internally reflected to one of the opaque surfaces such as bottom surface 108 or back surface 110, and absorbed. Virtually none of the light incident upon prism 20A from lamp 53 will exit image propagation surface 106. As a result, an observer looking into image propagation surface 106 will see only "black" when no finger is positioned on surfaces 116 or 118 of groove 102.

Characteristics of a finger 132 are described with reference to FIG. 15 for use throughout subsequent portions of this specification. As shown, the tip of finger 132 has a finger pad or base area which has a fingerprint 134 thereon. Fingerprint 134 is a pattern formed by ridges 136 (light areas) and valleys 138 (dark areas) of the finger pad.

Referring back to FIGS. 13 and 14, when finger 132 is positioned within groove 102, the total internal reflection properties of prism 20A are frustrated or destroyed at points at which ridges 136 of the fingerpad contact surfaces 116 and 118 of groove 102. As shown in detail in FIG. 14, portions of prism 20A at which ridges 136 contact a surface such as 116 of groove 102 are characterized by a skin-prism material boundary, while those portions at which valleys 138 are adjacent surface 116 are characterized by an air-prism material boundary as if a finger were never positioned in groove 102. At the areas at which ridges 136 contact surfaces 116 or 118 of groove 102, light which passes through the groove and into the skin will be partially absorbed by the skin and partially re-reflected back into prism 20A. Due to the different index of refraction of skin from that of air, this light which re-enters prism 20A at a skin-prism material boundary is refracted toward image propagation surface 106 and propagated therethrough. However, light which re-enters groove 102 at areas at which valleys 138 are adjacent surfaces 116 and 118 behaves as previously described due to the air-prism material interface between groove 102 and finger 132. When this light re-enters prism 20A, it is refracted downward and absorbed as previously described. These properties are illustrated graphically in FIG. 13. As a result, a visual image of fingerprint 134 (fingerprint image) is propagated through image propagation surface 106. This fingerprint image has "light" areas corresponding to ridges 136 of the fingerprint 134, and "dark" areas corresponding to valleys 138.

The fingerprint image of finger 132 propagated from prism 20A will be distorted from that of a planar "rolled" fingerprint image of the same finger. These distortions are broadly characterized as curvature errors, and size or scale errors, and are caused by different characteristics of finger 132, prism 20A, and their interaction.

As illustrated in FIG. 15, fingers such as 132 can be characterized by an imaginary longitudinal axis 139 which extends along the finger. The fingerpad on which fingerprint 134 is located is a compound curved surface in that it has base curvature about both an X-base curve axis 140 (generally referred to as an X-axis) and a Y-base curve axis 141 (generally referred to as a Y-axis). X-base curve axis 140 is oriented in a circumferential direction about longitudinal axis 139, and is formed by a locus of points which are perpendicular to a given point about the longitudinal axis.

Portions of fingerprint 134 about an X-base curve axis such as 140 would be colinear in a rolled fingerprint of fingerprint 134. However, the fingerprint image of fingerprint 134 propagated from image propagation surface 106 of prism 20A is planar, with an imaginary axis 142 which is perpendicular to the image plane (i.e., a plane "parallel" to image propagation surface 106) forming an observation angle OA with respect to longitudinal axis 139 of finger 132. Observation angle OA will be equal to angle A1 (FIG. 7) for those portions of the fingerprint image corresponding to portions of finger 132 which are positioned on fingerbody portion 113 of groove 102. Observation angle OA increases in accordance with the upwardly curved bottom wall 116 for those portions of the fingerprint image corresponding to portions of finger 132 which are positioned on fingertip portion 114 of groove 102. As a result of finger 132 being imaged at an observation angle OA which is between zero and ninety degrees and the curved nature of fingerprint 134 about X-base curve axis 140, portions of fingerprint 134 along an X-base curve axis such as 140 will appear as being curved upward in the fingerprint image, as opposed to being colinear if imaged at an observation angle OA of ninety degrees.

Figure 32:
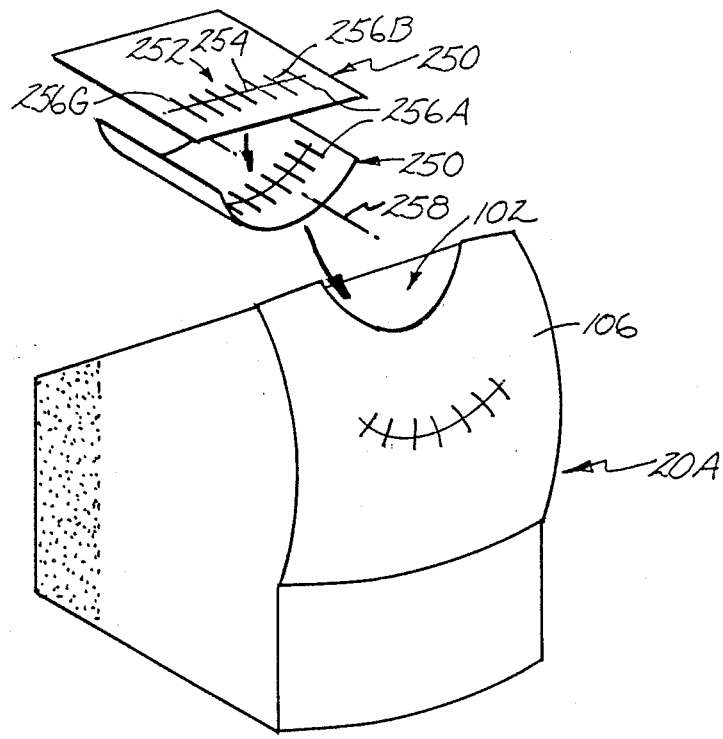
FIG. 32 is a view illustrating a template having a pattern of indicia thereon, and an image of the pattern of indicia when the template is positioned on the finger prism shown in FIG. 6.

A graphic representation of these curvature errors inherently produced by prism 20A is illustrated in FIG. 32 where an image of a line 254 is curved about an X-base curve axis such as 140 and positioned in groove 102. Although in theory the amount of curvature error changes for portions of fingerprint 134 at different X-base curve axes such as 140 along Y-base curve axis 141, in practice the amount of curvature error variation over the relatively small part of finger 132 which is imaged is small. Curvature errors at all points of fingerprint 134 along Y-axis 141 are therefore essentially equal.

Scale errors are also caused by the fact that fingerprint 134 is on a compound curved surface of finger 132, and is imaged at an observation angle OA other than ninety degrees with respect to longitudinal axis 139. As a result of being imaged at an observation angle OA, true distances of portions of fingerprint 134 along a given Y-base curve axis such as 141 will be distorted. For example, in the fingerprint image, two ridges 136 which are actually separated about Y-base curve axis 141 on the finger by a given amount will appear to be compressed and separated by a distance less than the given amount. Furthermore, this Y-axis scale error is not constant about Y-base curve axis 141 since observation angle OA increases as bottom surface 116 in fingertip portion 114 of groove 102 curves upward toward surface 100 in the direction of image propagation surface 106.

For similar reasons, X-axis scale errors are inherent in portions of the fingerprint image which represent portions of the fingerprint about an X-base curve axis such as 140. These X-axis scale errors are also nonlinear due to curvature of fingerprint 134 along its X-base curve axis 140. For example, portions of fingerprint 134 at its center (i.e., opposite the fingernail), and portions on its side, which are separated by a given distance along X-base curve axis 140 will appear to be separated by different distances in the fingerprint image. Distances on the side of finger 132 will be compressed with respect to those in the center of the fingerprint.

The curved or lensed nature of image propagation surface 106 of prism 20A magnifies the fingerprint image of fingerprint 134 before it is propagated therefrom. Since groove 102 is actually an elongated and compound curved surface, different portions of the groove, and therefore different portions of fingerprint 134 when finger 132 is placed within the groove, will be at different distances from image propagation surface 106. This factor coupled with well known geometric optic principles results in different portions of fingerprint 134 being magnified to different degrees or amounts. Portions of fingerprint 134 near tip 145 of finger 132 will be nearest surface 106 and magnified the least amount. Portions of fingerprint 134 near back 143 of finger 132 will be positioned furthest from surface 106 and magnified the most. Portions of fingerprint 134 near sides 144 (only one side is visible in FIG. 15) will be magnified by an amount between the amount of those portions at back 143 and tip 145.

The result of these different amounts of magnification is to partially correct for curvature and scale errors described above. Curvature and scale errors in the fingerprint image which correspond to portions of fingerprint 134 at sides 144 of finger 132 are reduced due to the magnification (i.e., the inherent compression is expanded). Scale errors in the fingerprint image which correspond to portions of fingerprint 134 at back 143 of finger 132 are also reduced for similar reasons. In general, the magnification properties of image propagation surface 106 of prism 20A have been found to reduce the curvature and scale erros in the fingerprint image.

Slap Print Prism

A first embodiment of slap print prism 18 is illustrated in FIGS. 16 and 17. Like individual finger prism 20A, slap print prism 18 has a first or finger-receiving surface 150, a second or light-receiving surface 154, a third or image propagation surface 156, a fourth or bottom surface 158, back surface 160, and side surfaces 162. Bottom surface 158 has a depth of dimension D20, and a width of dimension D21. Light-receiving surface 154 and back surface 160 are perpendicular to and have a height of dimensions D22 and D23, respectively, from bottom surface 158. Finger receiving surface 150 is planar, and forms an angle A5 with respect to bottom surface 158. Image propagation surface 156 is curved to function as a cylindrical lens, and has a radius of curvature of dimension D24 centered about a point at a distance of dimension D25 above the intersection of finger-receiving surface 150 and back surface 160, and a distance of dimension D26 toward light-receiving surface 154 from back surface 160. Image propagation surface 156 can therefore be characterized as a cylindrical lens having a radius of curvature about an imaginary horizontal axis 151 which is parallel to both back surface 160 and bottom surface 158. Dimension D21 of slap print prism 18 must be sufficient so as to enable a plurality of fingers (e.g., four fingers of a hand less the thumb) to be positioned on finger-receiving surface 150. In one preferred embodiment, dimension D21 is five inches. In the same embodiment, dimension D20 is 1.75 inches, dimension D22 is 1.38 inches, dimension D23 is 1.25 inches, dimension D24 is 1.00 inches, dimension D25 is 0.75, and dimension D26 is 0.88 inches.

Slap print prism 18 utilizes and operates on the same optical principles as that of individual fingerprint prism 20A described above. Bottom surface 158, side surfaces 162, and back surface 160 are coated with black paint so as to make these surfaces opaque. Slap print images of the four fingers of a hand, excluding the thumb, which are positioned on finger-receiving surface 150 will be propagated through image propagation surface 156. Valleys 138 of a finger such as 132 (FIG. 15) will be "dark" in the image, while ridges 136 will be light. The curved nature of image propagation surface 156 causes this surface to function as a lens, and magnifies the image in a direction corresponding to that along the longitudinal axis (i.e., Y-base curve axis) of the finger. This magnification partially corrects for scale errors along Y-base curve axis 141 (FIG. 15) due to the observation angle OA at which fingerprint 134 is imaged. Since finger-receiving surface 150 is planar, fingerprint 134 of a finger such as 132 is forced into a planar orientation when positioned on surface 150. As a result, X-axis curvature and scale errors in fingerprint images provided by slap print lens 18 are negligible compared to those of images provided by finger prisms such as 20A.

A second or alternative embodiment of the slap print prism, that being slap print prism 18', is illustrated in FIGS. 3A, 3B, 18 and 19. Slap print lens 18' is identical to slap print lens 18 previously described in all respects except for image propagation surface 156' which is coplanar with light-receiving surface 162. Image propagation surface 156' does not, therefore, magnify fingerprint images of fingers such as 132 positioned on finger-receiving surface 150. As a result, Y-axis scaling errors are not partially corrected. Slap print lens 18' functions in all other regards exactly like that of slap print lens 18 previously described.

Processor Subsystem

Processor subsystem 30 and its interrelationship to video camera 28, video monitor 14, printer 16, data terminal 6, LEDs 316A–316E and 318A–318E of display 13, LEDs 21A–21D of key pad 19, motor 76 and microswitches 87 and 89 is best described with reference to FIG. 20. As shown, processor subsystem 30 includes programmable computing means such as computer 200, random access memory or RAM 202, read only memory or ROM 204, and frame digitizer 206.

Fingerprint images from optics subsystem 22 are imaged by camera 28 through its objective lens. In response, camera 28 generates video signals which are representative of the fingerprint image. The video signals are then distributed to both video monitor 14 and frame digitizer 206. Video monitor 14 (which will typically be interfaced to microprocessor 200 through a video driver which is not shown) can thereby provide a real-time display of the fingerprint image being imaged by camera 28. In one preferred embodiment, camera 28 and monitor 14 are commercially available devices which utilize a standard raster and standard frame rates. Computer 200 is preferably a commercially available 32-bit microprocessor.

When an operator of fingerprinting system 10 observes on monitor 14 a fingerprint image they wish to "freeze" or record, key pad 19 will be appropriately actuated. In response, computer 200 will cause frame digitizer 206 to digitize the video signals of the frame being displayed on monitor 14, and provide digital image data characteristic of the "captured" fingerprint image to computer 200. The fingerprint image data is temporarily stored in RAM 202. Computer 200 then retrieves the fingerprint image data and processes it in accordance with image enhancement software programs which can be stored in ROM 204. Computer 200 thereby generates enhanced fingerprint image data. In response to operator control through data terminal 6, computer 200 can retrieve the enhanced image data from RAM 202 and provide it to video monitor 14. The enhanced fingerprint image can thereby be visually displayed. Alternatively, the operator can cause the enhanced image data to be propagated to printer 16 which will print the enhanced fingerprint image. Printer 16 is preferably a high resolution laser printer.

Frame digitizer 206 provides the digital image data in the form of an array of pixel values representative of the intensity of the fingerprint image at corresponding discrete or pixel locations. An image array IA of pixel values $PVn,m_I$ is illustrated in FIG. 21. Image array IA is formed of N rows and M columns of pixel values $PVn,m_I$. In one embodiment, image array IA is formed of N equal to four hundred and eighty rows and M equal to five hundred and twelve columns of pixel values $PVn,m_I$. Pixel values $PVn,m_I$ are digital values representative of the intensity of the fingerprint image at corresponding pixel locations PLn,m of image array IA. In one embodiment frame digitizer 206 includes an eight-bit analog-to-digital converter which converts the video signals to eight-bit pixel values $PVn,m_I$ characteristic of image intensity at corresponding pixel locations PLn,m. In this embodiment, an eight-bit pixel value $PVn,m_I$ representative of a decimal zero (i.e. "00000000") is a minimum pixel value PVMIN and characterizes a lowest intensity or darkest pixel location PLn,m. A pixel value representative of a decimal two hundred and fifty-six (i.e., "11111111") is a maximum pixel value PVMAX and represents a highest intensity or whitest pixel location. A pixel value $PVn,m_I$ representative of a digital 128 (i.e., "10101010") represents a pixel location PLn,m having an intensity half-way between the lowest and highest intensities (i.e., grey).

Having been generated by frame digitizer 206, pixel values $PVn,m_I$ of image array IA will be stored within RAM 202 at indexed locations corresponding to pixel locations PLn,m. Computer 200 will then retrieve image array pixel values $PVn,m_I$ and process them in accordance with a Noise Average software algorithm stored in ROM 204 to produce a noise averaged array NAA of pixel values $PVn,m_N$ (FIG. 22. Noise averaged pixel values $PVn,m_N$ are then temporarily stored within RAM 202 prior to implementation of subsequent image processing software algorithms. Following this approach, computer 200 generates an illumination equalized array IEA of illumination equalized pixel values $PVn,m_E$ in accordance with an Illumination Equalize algorithm, a directional filtered array DFA of directional filtered pixel values $PVn,m_D$ in accordance with a Directional Filter algorithm, and an unhaired array UA of unhaired (artifact removed) pixel values $PVn,m_U$ in accordance with an Unhair algorithm. Unhaired pixel values $PVn,m_U$ are then translated in position in accordance with a Curvature Correction algorithm to generate a curvature corrected array CCA of curvature corrected pixel values $PVn,m_C$. Curvature corrected pixel values $PVn,m_C$ are then scaled or translated in position, first vertically to produce a vertically scaled array VA of vertically scaled pixel values $PVn,m_V$, and then horizontally to produce a horizontally scaled array HA of horizontally scaled pixel values PVn,m$_H$. This processing is done in accordance with Vertical Scaling and Horizontal Scaling algorithms, respectively. Finally, the horizontally scaled array HA of pixel values PVn,m$_H$ is thresholded to produce a threshold array of thresholded values PVn,m$_T$ characteristic of the enhanced fingerprint image. The thresholded array of pixel values are then stored in RAM 202, and can be utilized by printer 16 to produce a printed record of the fingerprint image.

A. Noise Average

Figure 22:
FIG. 22 is a graphic representation of a noise averaged array of noise averaged pixel values generated by the processor subsystem shown in FIG. 20.

To initiate image processing, computer 200 will retrieve pixel values PVn,m$_I$ of image array IA (FIG. 21) from RAM 202, and process these pixel values in accordance with a Noise Average program stored within ROM 204. As a result of this processing, computer 200 generates a noise averaged array NAA of noise averaged pixel values PVn,m$_N$ as illustrated in FIG. 22. The Noise Average program removes random variations, or noise, in imaged pixel values PVn,m$_I$ which can be introduced for various reasons such as electronic or electromagnetic noise.

Each noise averaged pixel value PVn,m$_N$ at pixel locations PLn,m of noise averaged array NAA is computed as a function of weighted average of the particular image pixel value PVn,m$_I$ at the same pixel location PLn,m of image array IA, and a plurality of image pixel values PVn,m$_I$ at pixel locations PLn,m surrounding or in the area of the particular pixel value PVn,m$_I$ being noise averaged. In a preferred embodiment described below, noise averaged pixel values PVn,m$_N$ are computed as a function of a weighted average of a given image pixel value PVn,m$_I$, and pixel values PVn,m$_I$ at pixel locations PLn,m of image array IA immediately adjacent to the given pixel value. A formula for computing noise averaged pixel values PVn,m$_N$ in accordance with a preferred weighted average function is described by Equation 1 below. Other weighted average functions can of course also be used.

$$PVn,m_N = [4PVn,m_I + 2(PVn - 1, m_I + PVn,m + 1_I + PVn + 1, m_I + PVn,m - 1_I) + PVn - 1,m - 1_I + PVn - 1,m + 1_I + PVn + 1,m + 1_I + PVn + 1, m - 1_I]/16 \quad \text{Eq. 1}$$

The weighted average function of Equation 1 assigns the center pixel value PVn,m$_I$ (the particular pixel value to be noise averaged) a weight of four, adjacent side pixel values a weight of two, and adjacent corner pixel values a weight of one. Equation 2 below describes as an example the application of Equation 1 to a particular image pixel value PV2,2$_I$ to be noise averaged.

$$PV2,2_N = [4PV2,2_I + 2(PV1,2_I + PV2,3_I + PV3,2_I + PV2,1_I) + PV1,1_I + PV1,3_I + PV3,3_I + PV3,1_I]/16. \quad \text{Eq. 2}$$

It is evident that the weighted average function described by Equation 1 is not applicable to pixel values PVn,m$_I$ at pixel locations PLn,m at the edge of image array IA (i.e., pixel values PVn,m$_I$ for n=1 and 1≦m≦M, for 1≦n≦N and m=1, for n=N and 1≦m≦M, and for 1≦n≦N and m=M). The reason is that there are no "adjacent" pixel values beyond the edge of image array IA. In one embodiment these "edge" pixel values are ignored by the Noise Average program since they likely represent unimportant portions of the fingerprint image anyway. The noise averaged pixel values PVn,m$_N$ at these edges are simply set equal to their corresponding pixel values PVn,m$_I$ in the image array, as described by Equation 3.

$$PVn,m_N = PVn,m_I \text{ for: } n = 1, 1 \leq m \leq M;$$
$$1 \leq n \leq N, m = 1;$$
$$n = N, 1 \leq m \leq M; \text{ and}$$
$$1 \leq n \leq N, m = M \quad \text{Eq. 3}$$

Having generated a noise averaged array NA of pixel values PVn,m$_N$ in accordance with the above-described approach, computer 200 will store the noise averaged pixel values at indexed locations within RAM 202 for subsequent processing.

B. Illumination Equalize

In practice, the manner in which slap print prism 18' and finger prisms 20A–20D are illuminated by lamps 31 and 53, respectively, results in varying amounts of light being propagated by the prisms to different portions of a fingerprint such as 134 (FIG. 15) being imaged. As a result, the illumination intensity level over each fingerprint image imaged by camera 28 will vary. However, it is desirable that the fingerprint be illuminated with a constant intensity throughout. This is effectively performed by computer 200 which processes pixel values PVn,m$_N$ of noise averaged array NAA in accordance with an Illumination Equalize program stored in ROM 204, and generates an illumination equalized array IEA of illumination equalized pixel values PVn,m$_E$ illustrated in FIG. 23.

Figure 24:
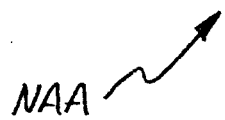
FIG. 24 is a graphic representation of the noise averaged array, illustrating a subarray of pixel values utilized by the processor subsystem to generate the illumination equalized array.

The generation of illumination equalized pixel values PVn,m$_E$ from noise averaged pixel values PVn,m$_N$ is described with reference to FIG. 24. For a particular pixel value PVn,m$_N$ at a particular pixel location PLn,m that it is desired to illumination equalize, computer 200 first selects a subarray SA of pixel values which includes the pixel value to be illumination equalized. Although subarray SA has been chosen as a three-by-three subarray with the particular pixel value PVn,m$_N$ to be equalized in the center thereof for purposes of example in FIG. 24, subarrays of a larger size are preferred and can produce better results. In one embodiment, computer 200 selects an eight-by-eight subarray of pixel values surrounding the pixel value to be illumination equalized. However, the algorithm is fully described with the three-by-three subarray SA illustrated in FIG. 24.

Having selected a subarray SAn,m, for the particular pixel value PVn,m$_N$ to be equalized, computer 200 will sum all pixel values PVn,m$_N$ within the subarray, and divide by the number of pixel values summed, to generate a subarray average value SAVn,m. Equation 4 below mathematically describes this procedure for the general three-by-three subarray SAn,m illustrated in FIG. 24.

$$SAVn,m = [PVn - 1,m - 1_N + PVn - 1,m_N + PVn - 1,m + 1_N + PVn,m - 1_N + PVn,m_N + PVn,m + 1_N + PVn + 1,m - 1_N + PVn + 1,m_N + \quad \text{Eq. 4}$$

-continued $$[PVn+1, m+1_N]/9$$

Computer 200 then computes the illumination equalized pixel value $PVn,m_E$ as a function of the particular noise averaged pixel value $PVn,m_N$ to be illumination equalized, the subarray average value $SAVn,m$ for the particular pixel value to be illumination equalized, and a constant K characteristic of an average illumination expected of pixel values of the image. Constant K (which can be stored in RAM 202 or ROM 204) is a threshold value and can be set as a function of noise in the fingerprint image. In one embodiment, constant K is representative of a pixel value PVn,m having an intensity halfway between the lowest and highest intensities which can be displayed on monitor 14 (e.g., K=(PVMAX−PVMIN)/2). Following the above example which utilizes an eight-bit analog-to-digital converter in frame digitizer 206, K would equal one hundred and twenty-eight.

In the course of carrying out these computations, computer 200 first generates a pixel difference value PDVn,m representative of the difference between the particular pixel value $PVn,m_N$ to be illumination equalized, and the subarray average value SAVn,m of the subarray of which it is an element. This operation is mathematically described by Equation 5.

$$PDVn,m = PVn,m_N - SAVn,m. \quad \text{Eq. 5}$$

Constant K is then added to pixel difference values PVDn,m to generate an intermediate illumination equalized pixel value IEPVn,m as described by Equation 6 below.

$$IEPVn,m = PDVn,m + K. \quad \text{Eq. 6}$$

The illumination equalized pixel value $PVn,m_E$ is finally computed as a function of its corresponding intermediate illumination equalized pixel value IEPVn,m. If the intermediate illumination equalized pixel value IEPVn,m is less than the minimum pixel value PVMIN or greater than the maximum pixel value PVMAX, the illumination equalized pixel value $PVn,m_E$ is unconditionally set to PVMIN or PVMAX, respectively. The illumination equalized pixel value $PVn,m_E$ is set to the intermediate illumination equalized pixel value IEPVn,m if IEPVn,m is greater than or equal to the minimum pixel value PVMIN, and less than or equal to the maximum pixel value PVMAX. These relationships are mathematically described by Equations 7-9 below.

$$PVn,m_E = PVMIN \text{ if } IEPVn,m < PVMIN. \quad \text{Eq. 7}$$

$$PVn,m_E = IEPVn,m \text{ if } PVMIN \leq IEPVn,m \leq PVMAX. \quad \text{Eq. 8}$$

$$PVn,m_E = PVMAX \text{ if } IEPVn,m > PVMAX. \quad \text{Eq. 9}$$

The procedures described above, including the selection of a subarray and the mathematical operations described by Equations 4-9, are carried out by computer 200 to generate an illumination equalized pixel value $PVn,m_E$ for each noise averaged pixel value $PVn,m_N$ to be illumination equalized. However, since subarrays SA are selected in such a manner that the pixel value $PVn,m_N$ to be illumination equalized is at or near its center, it is evident that this procedure cannot be used to illumination equalize pixel values $PVn,m_N$ near edges of noise averaged array NAA. For example, using the three-by-three subarray SA illustrated in FIG. 24, it will not be possible to illumination equalize the pixel values $PVn,m_N$ of the outermost rows and columns of noise averaged array NAA. Since these edge pixel values $PVn,m_N$ will likely represent unimportant parts of the fingerprint image, they are simply set equal to their noise averaged pixel values as described by Equation 10. A similar procedure is followed when using a subarray SA of larger size.

$$PVn,m_E = PVn,m_N \text{ for: } n = 1, 1 \leq m \leq M; \quad \text{Eq. 10}$$
$$1 \leq n \leq N, m = 1;$$
$$n = N, 1 \leq m \leq M; \text{ and}$$
$$1 \leq n \leq N, m = M.$$

Following the above-described procedure, an entire illumination equalized array IEA of pixel values $PVn,m_E$ can be generated by computer 200. Computer 200 will store illumination equalized pixel values $PVn,m_E$ in RAM 202 for subsequent processing.

C. Directional Filter

The fingerprint image characterized by illumination equalized array IEA is formed by pixel values $PVn,m_E$ which represent relatively light curves characteristic of fingerprint ridges 136 (FIG. 15), and pixel values which represent relatively dark curves characteristic of fingerprint valleys 138. To enhance the fingerprint image represented by illumination equalized array IEA, it has been found advantageous to filter pixel values $PVn,m_E$ in such a way as to emphasize the directional aspects of portions of the array representing fingerprint ridges 136 and valleys 138. This directional filtering is performed by computer 200 in accordance with a Directional Filter program stored within ROM 204. The result is a directional filtered array DFA of directional filtered pixel values $PVn,m_D$ as illustrated in FIG. 25.

Generally stated, the Directional Filtering program is implemented by computer 200 in a multiple-step manner. First, for each particular pixel value $PVn,m_E$ for $1 < n < N$, $1 \leq m < M$ of illumination equalized array IEA (i.e., for all pixel values $PVn,m_E$ other than those in the top and bottom rows and rightmost column) computer 200 computes an absolute value of the difference between that particular pixel value and a horizontally adjacent pixel value (HorizDif), a vertically adjacent pixel value (VertDif), an adjacent pixel value at a positive slope (PosDif) and an adjacent pixel value at a negative slope (NegDif). This procedure is described generally by Equations 11-14 below.

$$HorizDifn,m = |PVn,m_E - PVn,m+1_E| \quad \text{Eq. 11}$$

$$VertDifn,m = |PVn,m_E - PVn+1,m_E| \quad \text{eq. 12}$$

$$PosDifn,m = |PVn,m_E - PVn-1,mm+1_E| \quad \text{Eq. 13}$$

$$NegDifn,m = |PVn,m_E - PVn+1,m+1_E| \quad \text{Eq. 14}$$

Horizontal difference values HorizDifn,m vertical difference values VertDifn,m, positive difference values PosDifn,m and negative difference values NegDifn,m for pixel values $PVn,m_E$ for each $1 < n < N$ and $1 \leq m < M$ are stored at indexed locations within RAM 202.

Figure 26:
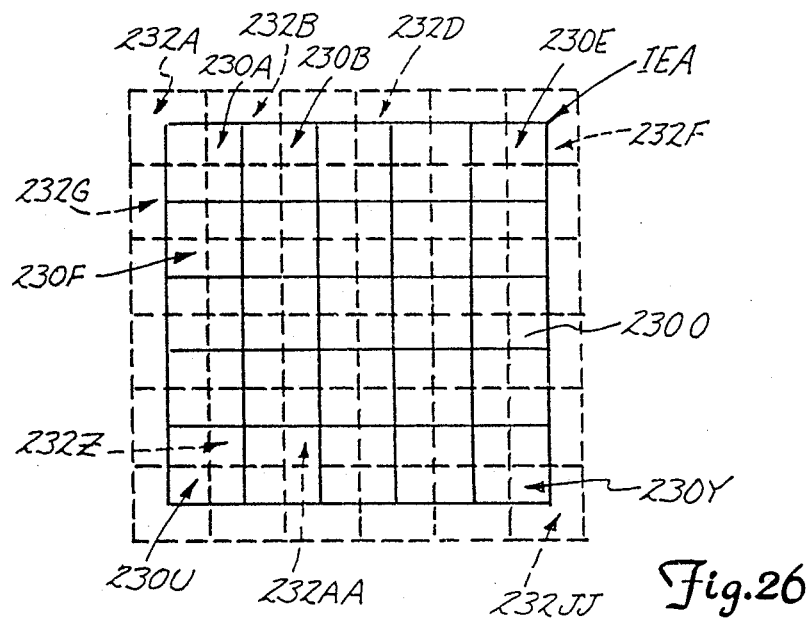
FIG. 26 is a graphic representation of an illumination equalized array illustrating the regular and offset subarrays utilized by the processor subsystem shown in FIG. 20 to produce the directional filtered array.

As illustrated graphically in FIG. 26, computer 200 next divides illumination equalized array IEA into a plurality of regular subarrays 230a-230y (illustrated with solid lines) and offset subarrays 232A-232JJ (illustrated with broken lines). Offset subarrays 232A-232JJ are offset both horizontally and vertically with respect to regular subarrays 230A-230Y in the embodiment shown. All pixel values $PVn,m_E$ of illumination equalized array IEA will be located within both one of regular subarrays 230A-230Y and one of offset subarrays 232A-232JJ. Subarrays 230A-230Y and 232A-232JJ are sized so as to have more pixel values $PVn,m_E$ on a side than an expected width of a fingerprint ridge 136 (FIG. 15) or valley 138 as represented by the pixel values of the subarray. In one embodiment, computer 200 causes subarrays 230A-230Y and 232A-232JJ to be rectangular with 32 pixel values $PVn,m_E$ per side when processing an image from a finger prism such as 20A.

Computer 200 next determines a "dominant direction" of the portion of the fingerprint image represented by pixel values $PVn,m_E$ of each regular subarray 230A-230Y and each offset subarray 232A-232JJ. This is done as a function of the difference values HorizDifn,m, VertDifn,m, PosDifn,m, and NegDifn,m computed for the pixel values $PVn,m_E$ within that particular subarray 230A-230Y and 232A-232JJ. This is done by computing, for each subarray 230A-230Y and 232A-232JJ, a sm HDSum, VDSum, PDSum, and NDSum of the difference values HorizDifn,m, VertDifn,m, PosDifn,m, and NegDifn,m, respectively, which were previously computed for pixel values $PVn,m_E$ within that subarray. This procedure is mathematically described by Equations 15-22.

$$HD\,Sum_{230xx} = \Sigma\, HorizDifn,m \quad \text{Eq. 15}$$

$$VD\,Sum_{230xx} = \Sigma\, VertDifn,m \quad \text{Eq. 16}$$

$$PD\,Sum_{230xx} = \Sigma\, PosDifn,m \quad \text{Eq. 17}$$

$$ND\,Sum_{230xx} = \Sigma\, NegDifn,m \quad \text{Eq. 18}$$

(For all $PVn,m_E$ of subarray 230xx for which difference values were computed)

$$HD\,Sum_{232xx} = \Sigma\, HorizDifn,m \quad \text{Eq. 19}$$

$$VD\,Sum_{232xx} = \Sigma\, VertDifn,m \quad \text{Eq. 20}$$

$$PD\,Sum_{232xx} = \Sigma\, PosDifn,m \quad \text{Eq. 21}$$

$$ND\,Sum_{232xx} = \Sigma\, NegDifn,m \quad \text{Eq. 22}$$

(For all $PVn,m_E$ of subarray 232xx for which difference values were computed)

An understanding of the operations described by Equations 15-22 is facilitated by FIG. 27, in which regular subarrays 230A-230Y and offset subarrays 232A-232JJ are sized to have four pixel values $PVn,m_E$ per side for purposes of example. It will be understood that for most subarrays 230A-230Y and 232A-232JJ (those which do not include pixel values $PVn,m_E$ in the top or bottom rows or rightmost column), difference values HorizDifn,m, VertDifn,m, PosDifn,m, and NegDifn,m for all pixel values $PVn,m_E$ within the subarray will have been computed and will be summed. However, for those subarrays which have pixel values $PVn,m_E$ in the top or bottom rows or rightmost column of illumination equalized array IEA, not all of the pixel values therein will have had difference values HorizDifn,m, VertDifn,m, PosDifn,m, and NegDifn,m, computed therefor. As a result, only those pixel values $PVn,m_E$ for which difference values were computed can be summed to contribute to difference value sums HDSum, VDSum, PDSum and HDSum of subarrays 230A-230Y and 232A-232JJ. As an example, for offset subarray 232A in FIG. 27, only pixel value $PV2,2_E$ had difference values computed therefor.

Following the above description, $HDSum_{232A} = HorizDif2,2$, $VDSum_{232A} = VertDif2,2$, $PDSum_{232A} = PosDif2,2$, and $NDSum_{232A} = NegDif2,2$. Also by way of example, for regular array 230A, $HDSum_{230A} = HorizDif2,2 + HorizDif2,3 + HorizDif2,4 + HorizDif3,2 + HorizDif3,3 + HorizDif3,3 + HorizDif4,2 + HorizDif4,3 + HorizDif4,4$.

Computer 200 next determines the dominant direction of each regular subarray 230A-230Y and offset subarray 232A-232JJ as a funtion of the difference value sums of that subarray. In particular, the dominant direction for a subarray 230xx is the direction or orientation associated with the lesser of $HDSum_{230xx}$, $VDSum_{230xx}$, $PDSum_{230xx}$ or $NDSum_{230xx}$ of that subarray$_{230xx}$. Similarly, the dominant direction of an offset subarray 232xx is the direction associated with the lesser of $HDSum_{232xx}$, $VDSum_{232xx}$, $PDSum_{232xx}$ or $NDSum_{232xx}$. In those cases in which more than one of the difference value sums are equal, the dominant direction is that direction which is 90° offset from the direction characterized by the greatest difference value sum.

Having determined the dominant directions, computer 200 performs a directional filter of each pixel value $PVn,m_E$ of image array IEA as a function of a weighted average of the particular pixel value and adjacent pixel values in the dominant direction of the subarrays 230A-230Y, 232A-232JJ of which the particular pixel value is an element.

A preferred embodiment of this directional filtering is best described as follows. First, each pixel value $PVn,m_E$ is directional filtered as a function of the dominant direction of the regular subarray 230A-230Y of wich it is a member to provide a regular subarray directional filtered pixel value $RSPVn,m_E$. Second, each pixel value is directional filtered as a function of the dominant direction of the offset subarray 232A-232JJ to provide an offset subarray directional filtered pixel value $OSPVn,m_E$ of which it is a member. Finally, the regular subarray directional filtered pixel value $RSPVn,m_E$ and offset subarray directional filtered pixel value $OSPVn,m_E$ are averaged to generate the corresponding directional filtered pixel value $PVn,m_D$ of directional filtered array DFA.

Preferred weighted average formulas for generating regular subarray directional filtered pixel values $RSPVn,m_E$ for a particular pixel value $PVn,m_E$ are described by equations 23-26.

$$RSPVn,m_E = (2\,PVn,m_E + PVn,m - 1_E + PVn,m + 1_E)/4 \quad \text{Eq. 23}$$

(when the dominant direction of the regular subarray is horizontal)

$$RSPVn,m_E = (2\,PVn,m_E + PVn - 1,m_E + PVn + 1,m_E)/4 \quad \text{Eq. 24}$$

-continued (when the dominant direction of the regular subarray is vertical).

$$RSPVn,m_E = \qquad \text{Eq. 25}$$
$$(2PVn,m_E + PVn - 1, m + 1_E + PVn + 1, m - 1_E)/4$$

(when the dominant direction of the regular subarray is positive slope).

$$RSPVn,m_E = \qquad \text{Eq. 26}$$
$$(2PVn,m_E + PVn - 1,m - 1_E + PVn + 1,m + 1_E)/4$$

(when the dominant direction of the regular subarray is negative slope).

Offset subarray directional filtered pixel values $OSPVn,m_E$ can be computed in a similar manner using equations 27-30.

$$OSPVn,m_E = (2PVn,m_E + PVn,m - 1_E + PVn,m + 1_E)/4 \qquad \text{Eq. 27}$$

(if the dominant direction of the offset subarrary is horizontal).

$$OSPVn,m_E = (2PVn,m_E + PVn,m - 1_E + PVn + 1,m_E)/4 \qquad \text{Eq. 28}$$

(if the dominant direction of the offset subarrary is vertical).

$$OSPVn,m_E = \qquad \text{Eq. 29}$$
$$(2PVn,m_E + PVn - 1,m + 1_E + PVn + 1,m - 1_E)/4$$

(if the dominant direction of the offset subarrary is positive slope).

$$OSPVn,m_E = \qquad \text{Eq. 30}$$
$$(2PVn,m_E + PVn - 1,m - 1_E + PVn + 1,m + 1_E)/4$$

(if the dominant direction of the offset subarrary is negative slope).

Directional filtered pixel values $PVn,m_D$ are generated by computer 200 by averaging corresponding regular subarray pixel values $RSPVn,m_E$ and offset subarray pixel values $OSPVn,m_E$. The procedure is described mathematically by Equation 31.

$$PVn,m_D = (RSPVn,m_E + OSPVn,m_E)/2 \qquad \text{Eq. 31}$$

Following the above-described procedure, computer 200 can generate a directional filtered array DFA of directional filtered pixel values $PVn,m_D$ as illustrated in FIG. 25. For pixel values $PVn,m_E$ in the top and bottom rows and rightmost column of illumination equalized array IEA which are not directional filtered, computer 200 sets their corresponding directional filtered pixel value equal to their illumination equalized pixel value, as described by equation 32 below. This procedure will not materially affect the image represented by directional filtered array DFA since these pixel values are on the edges.

$$PVn,m_D = PVn,m_E \text{ for: } n = 1, 1 \leq m < M \qquad \text{Eq. 32}$$
$$n = N, 1 \leq m < M$$
$$1 \leq n \leq N, m = M$$

The fingerprint image represented by directional filtered array DFA will typically include artifacts of "hairs" which are undesirable noise components of the image. Artifacts such as 240 are shown within fingerprint image 242 in FIG. 28. As is evident from FIG. 28, artifacts 240 typically are finer than or have a width which is less than either valleys 138 or ridges 136 of the fingerprint image. To enhance the image represented by directional filtered array DFA, computer 200 "unhairs" the image by processing this array in accordance with an Unhair program stored within ROM 204. The result is an artifact removed or unhaired array UA of unhaired pixel values $PVn,m_U$ illustrated in FIG. 29.

Figure 28:
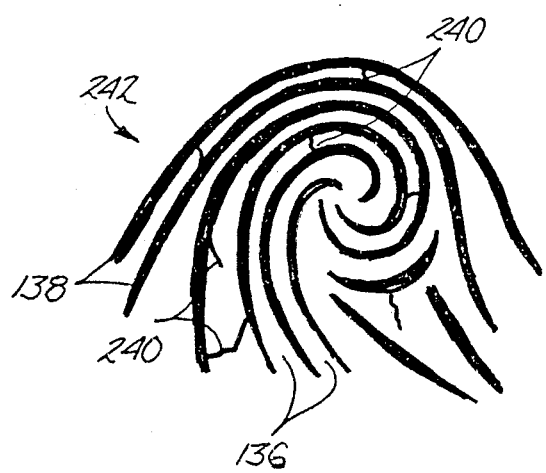
FIG. 28 is a graphic representation of a fingerprint image showing artifacts or hairs therein.
Figure 30:
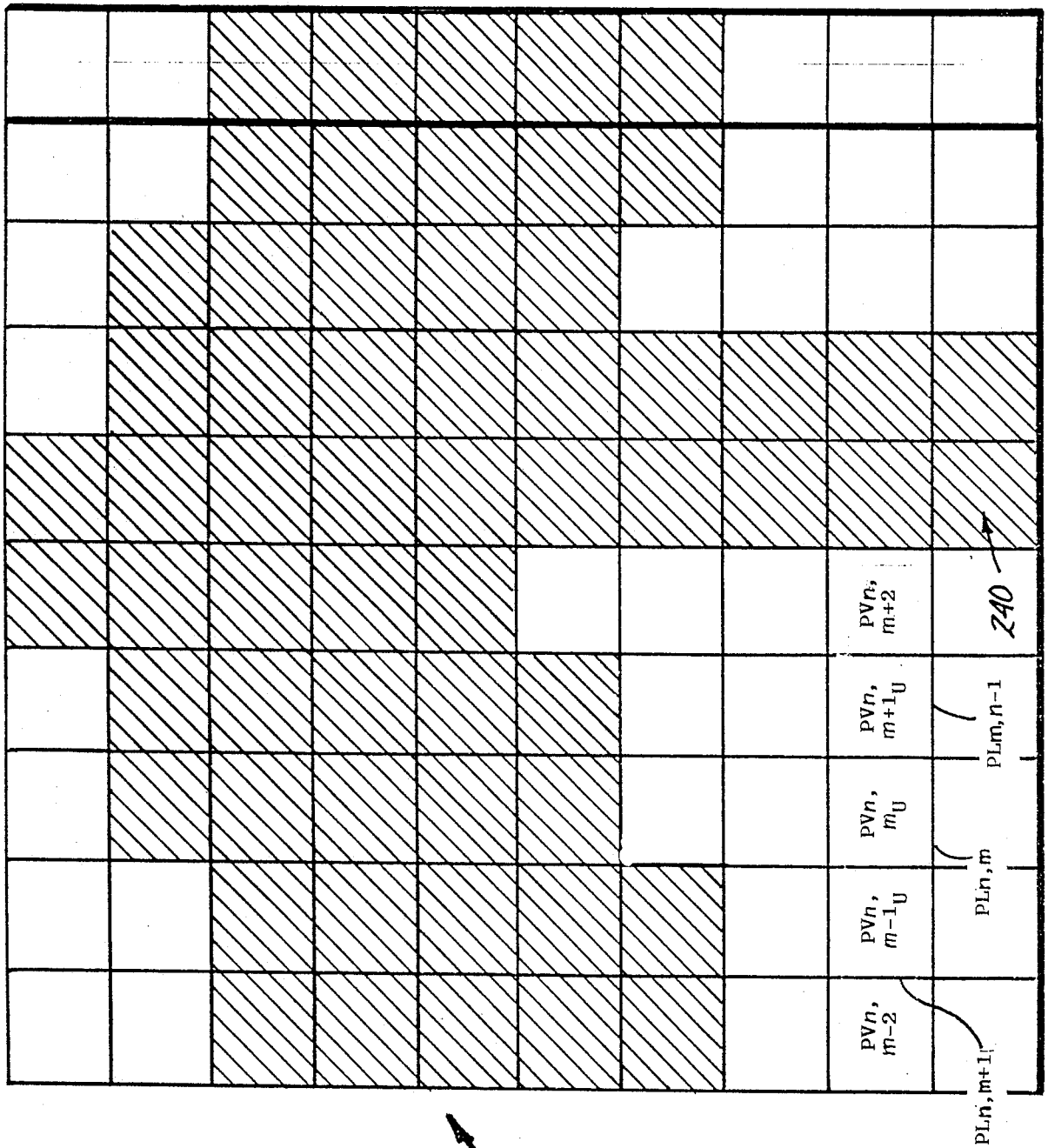
FIG. 30 is a graphic representation of a directional filtered array illustrating a portion of a fingerprint image having an artifact or hair therein.

The Unhair program implemented by computer 200 operates on the assumption that artifacts 240 will have a width which is less than the width of either valleys 138 or ridges 136 of a fingerprint image such as 242 illustrated in FIG. 28 (as represented by directional filtered array DFA). It is therefore assumed that the width of valleys 138 and ridges 136 will occupy a minimum number of adjacent pixel locations PLn,m of directional filtered array DFA, while the width of an artifact 240 will occupy less than the number of adjacent pixel locations of a valley or ridge. A graphic representation of a portion of directional filtered array DFA illustrating a valley 138 and artifact 240 is illustrated in FIG. 30. It must be understood that the shading in FIG. 30 is merely for purposes of illustration, and is actual representative of the magnitude of pixel values $PVn,m_D$ at the corresponding pixel locations PLn,m. In FIG. 30, artifact 240 is vertically oriented and has a width of two pixel locations PLn,m, while valley 138 has a minimum width of five "occupied" pixel locations PLn,m.

Data representative of the width of artifacts 240 that it is desired to remove, in terms of a number W of adjacent pixel locations PLn,m this width would occupy, is stored in RAM 202 or ROM 204. In one embodiment, it is assumed that a vertical "feature" of fingerprint image 242 which has a width less than W equals two pixel locations PLn,m is an artifact 240. Any vertically oriented features which are not more than W pixel locaions PLn,m wide are deemed to be artifacts 240, and the pixel values $PVn,m_D$ representing these features are unconditionally set to a value of PVMAX so as to eliminate these features from the image.

Following the Unhair program to eliminate vertically oriented artifacts 240, computer 200 processes groups of W+2 horizontally adjacent pixel values $PVn,m_D$ of directional filtered array DFA, i.e., $PVn,m-_D$, $PVn,m_D$, $PVn,m+1_D$, ... $PVn,m+W_D$. Each of these pixel values must be compared to an unhair threshold value UT to determine if it is representative of a dark portion image 242 (i.e., a valley 138 or artifact 240), or a light portion (i.e., a ridge 136). Pixel values $PVn,m_D$ which are less than threshold value UT are deemed to represent dark portions of image 242, while those greater than or equal to threshold value UT are deemed to represent light portions of the image. Threshold value UT can be stored in RAM 204, and be equal to (PVMAX−PVMIN)/2.

Computer 200 first looks to a group of W horizontally adjacent pixel values PVn,m to PVn,m+(W−1). If each of these values is less than the threshold value UT, then they are known to represent a dark feature of image 242. If this feature is a fingerprint valley 138, then one of the pixel values PVn,m adjacent to this group (i.e., one of PVn,m−1, or PVn,m+W) will also be dark, i.e., less than threshold UT. If this is the case, then the corresponding unhaired pixel value PVn,m$_U$ is set to the value of its corresponding directional filtered pixel value PVn,m$_D$. This relationship is mathematically described by Equation 32a below.

If the group of W adjacent pixel values PVn,m to PVn,m+(W−1) are all less than the threshold UT but both adjacent pixel values PVn,m−1 and PVn,m+W are greater than or equal to the threshold UT, the group of W adjacent pixel values represent an artifact, and computer 200 sets all pixel values PVn,m−1$_U$ to PVn,m+W$_U$ equal to PVMAX, thereby eliminating the artifact from the image. This relationship is mathematically described by Equation 32b, and takes precedence over equation 32a. That is, a pixel value PVn,m$_U$ initially set in accordance with equation 32a can subsequently be set to PVMAX in accordance with equation 32b.

Finally, computer 200 will set pixel values PVn,m$_U$ equal to the corresponding value PVn,m$_D$ in directional filtered array DFA if not all W adjacent pixels PVn,m to PVn,m+(W−1) of the group are less than threshold UT. This relationship is described mathematically by equation 32a. Once the above procedure has been implemented for all pixel values PVn,m for $1 \leq n \leq N$, $2 \leq m \leq M-W$, an unhaired array UA is generated. The Unhair program is not performed on edge pixel values PVn,m$_D$ for $1 < n < N$, $M-W < m \leq M$. For these pixel values, PVn,m$_U$ are set equal to PVn,m$_D$ in accordance with Equation 32c.

For each PVn,m for $1 \leq n \leq N$, $2 \leq m \leq M-W$. If PVn,m$_D$ and PVn,m+1$_D$ . . . and PVn,m+(W−1)$_D$<UT and:

PVn,m−1$_D$ or PVn,m+W<UT or if any of PVn,m$_D$, PVn,m+1$_D$, . . . PVn,m+(W−1)$_D$<UT then:

PVn,m$_U$=PVn,m$_D$    Eq. 32a

If PVn,m$_D$ and PVn,m+1$_D$, . . . and PVn,m+(W−1)$_D$<UT and:

PVn,m−1$_D$ and PVn,m+W$_D$≧UT then:

PVn,m−1$_D$, PVn,m$_D$, . . . and
PVn,m+W$_D$=PVMAX    Eq. 32b

PVn,m$_U$=PVn,m$_D$ for $1 < n < N$, $M-W < m \leq M$.    Eq. 32c

Horizontally oriented artifacts can be removed in a similar manner using groups of W vertically adjacent pixel values PVn,m$_D$. However, experience has shown most artifacts 240 to be vertically oriented.

E. Curvature Correction

As previously discussed, since finger prisms 20A-20D provide fingerprint images which are taken at an observation angle OA with respect to a longitudinal axis 139 of finger 132 (FIG. 15), those portions of the fingerprint which are positioned adjacent one another about an X-base curve axis 140 at any given point about the longitudinal axis and which would be linearly positioned with respect to one another in a rolled fingerprint image, will actually be projected in such a manner as to appear to be curved in an upwardly arced manner within unhaired array UA. Computer 200 processes pixel values PVn,m$_U$ of unhaired array UA in accordance with a Curvature Correction program to produce a curvature corrected array CCA (FIG. 31) of curvature corrected pixel values PVn,m$_C$ which characterize the fingerprint image in a curvature corrected manner. Basically, the Curvature Correction program causes unhaired pixel values PVn,m$_U$ to be translated vertically in position in acordance with tabulated curvature correction data characteristic of the curvature inherent in images provided by prisms 20A-20D.

Figures 33, 34:
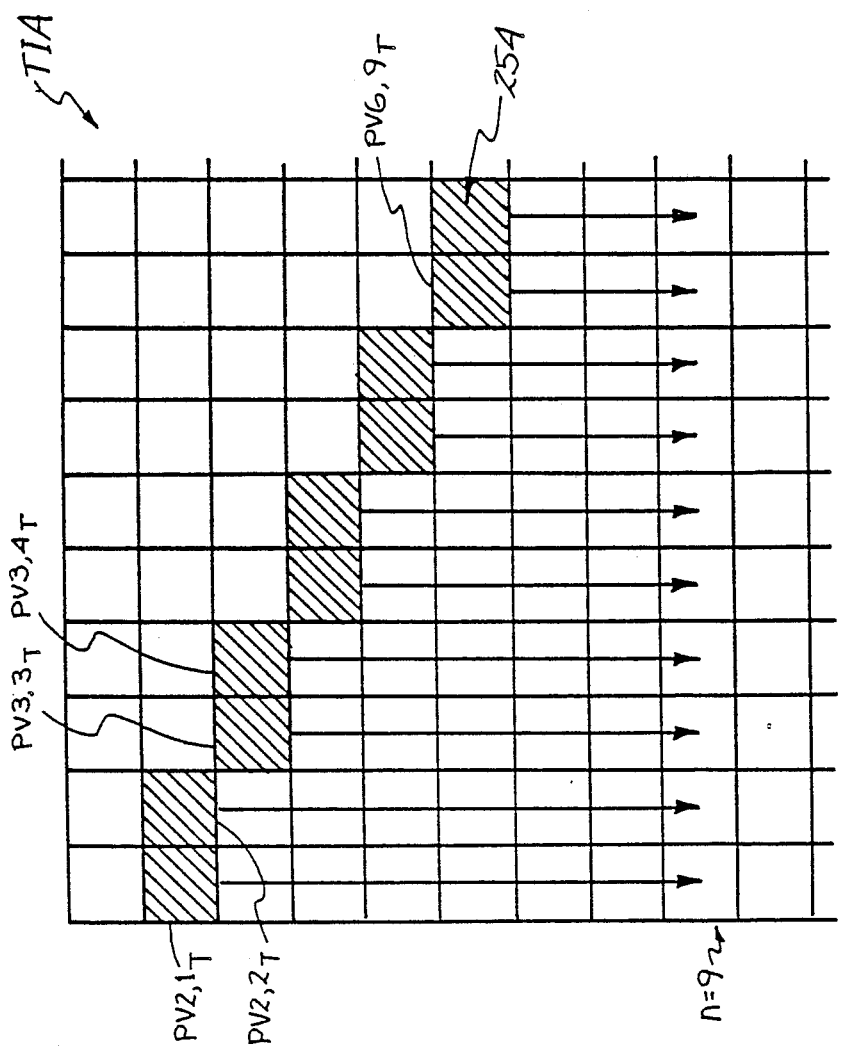
FIG. 33 is a graphic representation of a curvature correction table of curvature correction data generated and used by the processor subsystem shown in FIG. 20 to produce the curvature corrected array shown in FIG. 31.
FIG. 34 is a graphic representation of a template image array of template image pixel values generated by the processor subsystem shown in FIG. 20 and representing an image of the pattern of indicia shown in FIG. 32.

Curvature correction data is generated by computer 200 through the use of a flexible template 250 as illustrated in FIG. 32. As shown, template 250 has a linear pattern of indicia 252 which can include a line 254 and hatch marks 256A-256G at known and preferably evenly spaced locations thereabout. Template 250 is shaped in such a manner as to correspond to the curvature of the finger, with line 254 oriented perpendicular to an imaginary axis 139 representing the longitudinal axis of finger 132. Line 254 will therefore be parallel to an X-base curve axis 140 of finger 132. Shaped template 250 is then positioned within groove 102 of prism 20A with pattern of indicia 252 oriented in the above-identified manner. As a result of the optical transfer function of prism 20A, the image of line 254 propagated from face 106 of prism 20A will be shaped in the form of an arc opening upward. A graphical illustration of this image as represented by template image array TIA is shown in FIG. 34. Although line 254 is graphically illustrated in FIG. 34, it is to be understood that the shading is actually represented by the magnitude pixel values PVn,m$_T$ at the particular pixel locations.

Curvature correction data is generated from template image array TIA in the following manner. All curvature distortion inherent in the transfer function of prism 20A occurs along a y-axis parallel to a vertical line through the longitudinal axis of the finger when positioned in groove 102 of prism 20A (and generally parallel to surface 106). Furthermore, it is assumed that all pixel values PVn,m for any column $1 \leq m \leq M$ within template image array TIA are distorted by the same amount. That is, the amount of distortion for all pixel values PV$1 \leq n \leq N$,M, for example, are equal.

Were line 254 undistorted by the optical properties of prism 20A, the pixel values PVn,m representing line 254 (e.g., PV2,1$_T$, PV2,2$_T$, PV3,3$_T$, PV3,4$_T$) would all be adjacent one another in the same row (e.g., n=9) within template image array TIA. Curvature correction data for pixel values PVn,m$_T$ for each column $1 \leq m \leq M$ can therefore be defined in terms of an offset OFFm from an expected position, where m is the column within array TIA. For purposes of example, it will be assumed that all of the pixel values illustrated in FIG. 34 which represent line 254 should actually be positioned in row n=9. Offsets OFFm can be expressed in terms of the number of pixel locations PLn,m by which the pixel value PVn,m$_T$ is vertically displaced from its proper location (e.g. row n=9). Using the example shown in FIG. 32, OFF1 and OFF2 equal seven, OFF3 and OFF4 equal six and OFF9 and OFF10 equal three. Following this procedure, a curvature correction table of curvature correction or offset data OFF1-OFFM (illustrated in FIG. 33 for array TIA shown in FIG. 34) is generated by computer 200 and stored in RAM 202 or ROM 204.

Computer 200 utilizes the offset data in the curvature correction table to generate curvature corrected array CCA of curvature corrected pixel values $PV_{n,m_C}$ from unhaired array UA. Computer 200 does this by determining pixel values $PV_{n,m_C}$ of curvature corrected array CCA as a function of the pixel values $PV_{n,m_U}$ in the unhaired array and offsets $OFF_m$, as described by equation 33, below.

$$PV_{n,m_C} = PV_{n-OFF_m,m_U} \qquad \text{Eq. 33.}$$

Using the offsets of the example illustrated in FIG. 32 and described above and in the table illustrated in FIG. 33, for example, $PV9,1_C = PV9-7,1_U = PV2,1_U$, $PV9,9_C = PV9-3,9_U = PV6,9_U$. Similarly $PV10,9_C = PV7,9_U$.

Following the above procedure a curvature corrected array CCA of curvature corrected pixel values $PV_{n,m_C}$ can be produced. For those pixel values $PV_{n,m_C}$ for $1 \leq n < OFF_m$ of a given row $1 \leq m \leq M$ of curvature corrected array CCA there will obviously be no pixel values $PV_{n,m_U}$ within unhaired array VA to "translate." These pixel values $PV_{n,m_C}$ are simply set equal to PVMAX or PVMIN, as they define the edge of the fingerprint image represented by array CCA.

The above procedure has been described for finger prism 20A. However, due to the different characteristics of groove 102 of prisms 20A-20D, a separate table of curvature correction data such as that illustrated in FIG. 33 will be generated by computer 200 for each prism. Computer 200 will then utilize the table of curvature correction data corresponding to the particular prism 20A-20D from which the image being processed was propagated, to curvature correct the unhaired array UA representative of the image.

F. Vertical Scaling

As previously discussed, fingerprint images produced by finger prisms 20A-20D and slap print prisms 18 and 18' will have vertical or Y-axis size or scale errors due to the observation OA at which fingerprint 134 of finger 132 is imaged (FIG. 15). This vertical scale error is compounded on fingerprint images produced by finger prisms 20A-20D since portions of fingerprint 134 near tip 145 curve upward, effectively increasing the observation angle at these locations. This vertical scale error can also be thought of a paralax error. Since the image is taken at an angle other than 90° with respect to the "plane" of the fingerprint, true distances along Y-axis 141 which are parallel to the longitudinal axis 139 of finger 132 are "compressed", along the vertical axis of the fingerprint image such as that represented by curvature corrected array CCA. In other portions of the image, distances about Y-axis 141 can be "expanded" from their true distance on the fingerprint.

Figure 35:
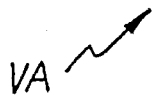
FIG. 35 is a graphic representation of a vertically scaled array of vertically scaled pixel values generated by the processor subsystem shown in FIG. 20.

To correct those vertical scale errors, computer 200 processes curvature corrected array CCA in accordance with a Vertical Scaling program to generate a vertically scaled array VA of vertically scaled pixel values $PV_{n,m_V}$ as illustrated in FIG. 35. A table of vertical scale correction data is generated for each prism 20A-20D, 18 and 18' within system 10, and stored in either RAM 202 or ROM 204. Computer 200 utilizes the table of vertical scale correction data to generate vertically scaled array VA.

Figure 36:
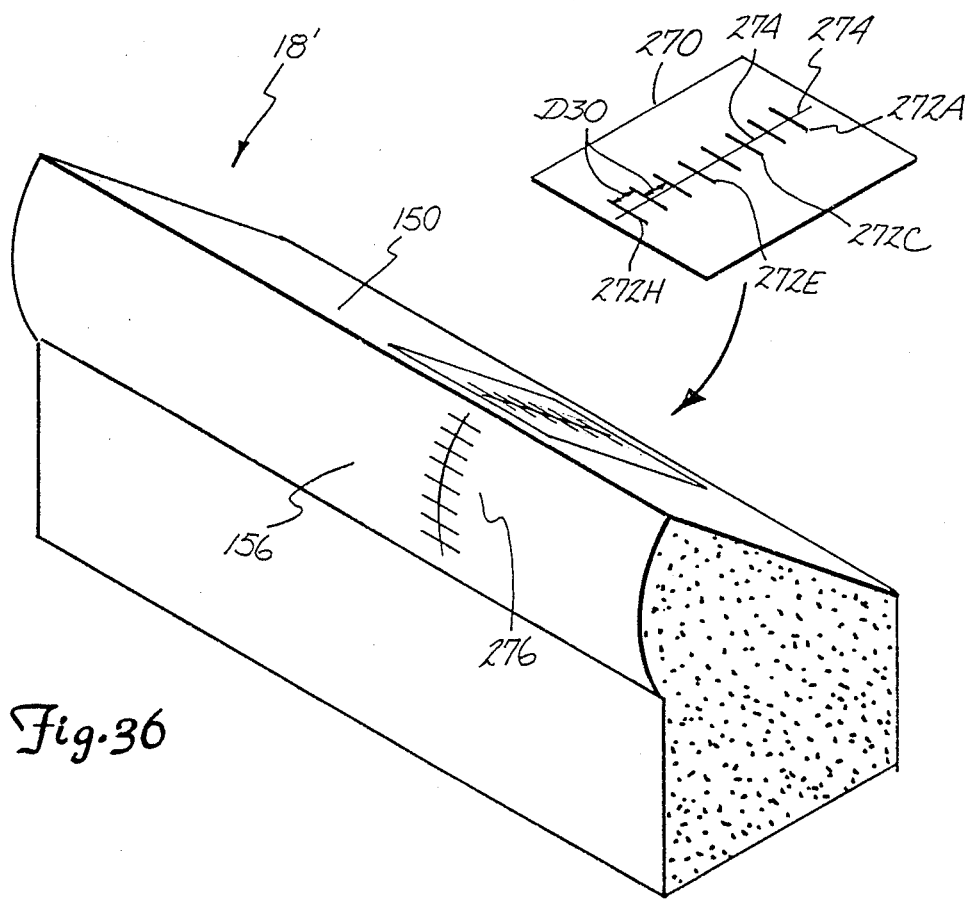
FIG. 36 is a view illustrating a template having a pattern of indicia thereon, and an image of the pattern of indicia when the template is positioned on the slap print prism shown in FIG. 16.

The generation of the table of vertical scale correction data for prism 18 (which is representative of a generation of vertical scaling correction data for prisms 20A-20D and 18') is described with reference to FIG. 36. As shown, a template 270 will have a pattern of indicia 272A-272H which are spaced about a Y-axis 274 by known and preferably equal distances D30. Template 270 is positioned on finger-receiving surface 150 of prism 18 with axis 274 oriented parallel to a longitudinal axis such as 139 of a finger such as 132 when positioned on prism 18. An image 276 of the pattern of indicia 272A-272H will be propagated from image propagation surface 156, imaged by camera 28 (FIG. 2), and the data representative of this image processed by computer 200 in accordance with the various programs described above until a curvature corrected array CCA of image 276 is generated.

Figure 37:
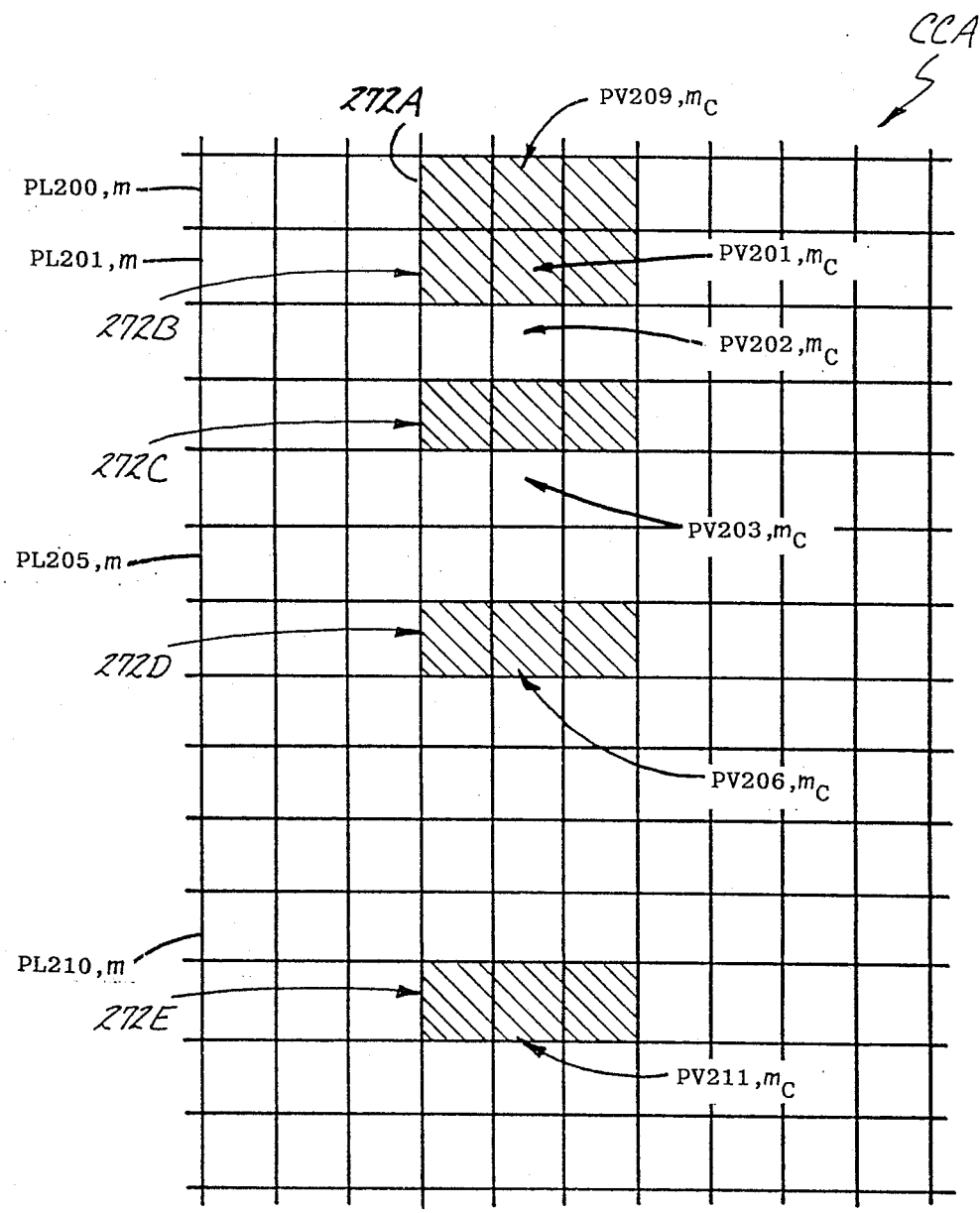
FIG. 37 is a graphic representation of a curvature corrected array generated by the processor subsystem shown in FIG. 20 and representative of the image of the pattern of indicia shown in FIG. 36.

A portion of a curvature corrected array CCA representative of image 276 and the pattern of indicia 272A-272H is illustrated diagramatically in FIG. 37. Indicia 272A-272E are illustrated graphically in FIG. 37 for purposes of example. However, it is to be understood that the magnitude of the image at the particular pixel locations of indicia 272A-272H in curvature corrected array CCA are actually represented by pixel values $PV_{n,m_C}$.

Since indicia 272A-272H are separated by known distances on template 270, these known distances would correspond to predetermined numbers of pixel location $PL_{n,m}$ in the vertical or "n" direction of curvature corrected array CCA. In the embodiment of template 270 illustrated in FIG. 36, indicia 272A-272H are separated by equal known distances D30. Were there no vertical scale error, the representation of each indicia 272A-272H would be separated from each other in the vertical direction of array CCA by the same predetermined number (e.g., three) pixel locations $PL_{n,m}$. However, due to the scale errors inherent in prism 18, indicia 272A-272H will be separated by differing numbers of pixel locations $PL_{n,m}$. In the example shown in FIG. 37, indicia 272A and 272B are compressed, separated by no pixel locations $PL_{n,m}$, and adjacent to one another. Indicia 272B and 272C are also compressed, but not quite as much, and are separated by one pixel location $PL_{n,m}$. Indicia 272D and 272E, on the other hand, are vertically expanded from their normal positional relationship, and separated by four pixel locations $PL_{n,m}$.

A table 280 of vertical scale correction data generated by computer 200 is illustrated graphically in FIG. 38. Data within table 280 characterizes locations of pixel values $PV_{n,m_V}$ in vertically scaled array VA as a function of the vertical location within curvature corrected array CCA at which the pixel value should be taken. With respect to FIG. 37, for example, it is assumed that pixel values $PV200,m_C$ will be correctly positioned in the same row of vertically scaled array VA. That is, pixel values $PV200,m_V = PV200,m_C$. However, it is known that indicia 272B should be spaced from 272A by three pixel locations $PL_{n,m}$ in the example used above. Pixel values $PV201,m_C$ of curvature corrected array CCA should therefore be positioned in row 204 of vertically scaled array VA. Table 280, therefore, includes data which characterizes pixel values $PV204,m_V$ as being equal to pixel values $PV201,m_C$ of curvature corrected array CCA.

Since indicia 272A and 272B were compressed due to the optical transfer properties of prism 18, information therebetween is lost. Computer 200 thereby "fills in" this lost information by inserting or repeating pixel values $PV201,m_V$-$PV203,m_V$ of vertically scaled array VA with information at one of either pixel values $PV200,m_C$ or $PV201,m_C$ of the curvature corrected array CCA. In the embodiment shown in FIG. 38, all pixel values $PV201,m_V$-$PV203,m_V$ are set equal to pixel value $PV201,m_C$ of curvature corrected array CCA.

Following the above example, it is also known that indicia 272C should be spaced vertically from indicia 272B by three pixel locations PLn,m. All pixel values $PV203,m_C$ of the 203rd row in curvature corrected array CCA should therefore actually be positioned in the 208th row of vertically scaled array VA. Accordingly, computer 200 generates data within table 280 associating pixel values $PV203,m_C$ of curvature corrected array CCA with pixel values $PV208,m_V$ of the vertically scaled array VA. Portions of the image which were lost due to compression between indicia 272B and 272C are "filled in" by repeating pixel values $PV202,m_C$ of the curvature corrected array CCA at pixel values $PV205,m_V$-$PV207,m_V$ of vertically scaled array VA. Data characteristic of this filling in or repetition of pixel values is characterized in table 280. Procedures similar to those described above are repeated for pixel value $PV212,m_V$ of vertically scaled array VA which should actually be equal to pixel values $PV206,m_C$ in curvature corrected array CCA.

Indicia 272D and 272E would also be separated by three pixel locations PLn,m were no vertical scaling errors inherent in prism 18. However, indicia 272D and 272E have been "expanded" by the optical properties of prism 18, and they are actually separated by four pixel locations PLn,m. In other words, pixel values $PV211,m_C$ in curvature corrected array CCA should actually be spaced from pixel values $PV212,m_V$ of vertical scaled array VA (which correspond to pixel values $PV206,m_C$ in curvature corrected array CCA) by three pixel locations PLn,m. Accordingly, computer 200 causes data representative of the fact that pixel values $PV216,m_V$ of vertically scaled array VA should actually be equal to pixel values $PV211,m_C$ of curvature corrected array CCA in table 280.

Since indicia 272D and 272E were expanded, portions of the image therebetween are redundant and must be eliminated. In this particular example, one row of pixel values $PVn,m_C$ must be eliminated from the curvature corrected array CCA. In generating vertical scaling correction data in table 280, computer 200 has eliminated pixel values $PV208,m_C$ of curvature corrected array CCA.

The above procedure is carried out for all pixels $PV1,m_V$-$PVN,m_V$ of vertically scaled array VA to generate vertical scale correction data in table 280 which characterizes the row within curvature corrected array CCA from which each row of pixel values $PVn,m_V$ of vertically scaled array VA should be taken. It has been found, however, that by vertically scaling the image in this manner, that there will be no corresponding pixels $PVn,m_C$ in curvature corrected array CCA which are properly translated to positions near the top and bottom edges of vertically scaled array VA. These portions of vertically scaled array VA, typically for rows n less than 100 and n greater than 400 for a 512 pixel array, are set equal to PVMAX so that will be represented as white in the output image. Computer 200 causes data representative of this inherent feature to be stored in table 280 of vertical scaling correction data as illustrated in FIG. 38.

To generate vertically scaled array VA, computer 200 utilizes data stored in memory and representative of table 280 (vertical scale correction data) along with pixel values $PVn,m_C$ of curvature corrected array CCA. For each pixel value $PVn,m_V$ of vertically scaled array VA, computer 200 accesses table 280 to determine from which row of curvature corrected array CCA the pixel value $PVn,m_C$ should be taken. For example, to produce a vertically scaled array VA from curvature corrected array CCA shown in FIG. 31 utilizing vertical scale correction data in table 280, pixel values $PV200,m_V$ will be set equal to corresponding pixel values $PV200,m_C$ of curvature corrected array CCA. Pixel values $PV200,200_V$ of vertically scaled array VA will, for example, be set equal to pixel value $PV200,200_C$ of curvature corrected array CCA. Following a similar approach, pixel values $PV211,m_V$ of vertically scaled array VA will be said equal to corresponding pixel values $PV205,m_C$. Pixel value $PV211,200_V$ of vertically scaled array VA will, for example, be set equal to pixel value $PV205,200_C$ of curvature corrected array CCA. Utilizing the scaling data in table 280, all pixel values $PV1,m_V$ and $PVN,m_V$ are set equal to values PVMAX. Computer 200 will then store data representative of vertically scaled array VA in RAM 202.

G. Horizontal Scaling

As previously discussed, fingerprint images produced by finger prisms 20A-20D will have horizontal or X-axis size or scale errors due to the observation angle OA at which finger 134 of finger 132 is imaged, and the fact that portions of the fingerprint are positioned about a curved surface such as that represented by X-base curve axis 140 at sides 144 of fingerprint 143. Since the image is taken at an observation angle other than 90° with respect to the "plane" of the fingerprint at any particular point, two distances along X-axis 140 are "compressed" along the horizontal axis of the fingerprint image such as that represented by vertically scaled array VA. In other portions of the image, distances about X-axis 140 can be "expanded" from their true distance on the fingerprint.

To correct for these horizontal scale errors, computer 200 processes vertically scaled array VA in accordance with a Horizontal Scaling program to generate a horizontally scaled array HA of horizontally scaled pixel values $PVn,m_H$ as illustrated in FIG. 39. A table 310 of vertical scale correction data such as that illustrated in FIG. 40 is generated for each prism 20A-20D within system 10, and stored in either RAM 202 or ROM 204. Computer 200 utilizes the table such as 310 of horizontal scale correction data to generate horizontally scaled array HA.

The generation of a table 310 of horizontal scale correction data for prism 20A (which is representative of generation of tables of horizontal scale correction data for prisms 20A-20D) is described initially with reference to FIG. 32. As shown in FIG. 32, a template 250 has a pattern of indicia 252 which includes hatch marks 256A-256G spaced about a line 254 by known and preferably equal distances. Template 250 is then shaped to conform to groove 102 of prism 20A, and positioned within the group in such a manner that line 254 is perpendicular to a longitudinal axis of the groove.

This procedure is performed in a manner identical to that previously described with reference to the Curvature Correction program. An image of pattern of indicia 252 and hatch marks 256A-256G will be propagated from image propagation surface 106, imaged by camera 28 (FIG. 2), and data representative of this image processed by computer 200 in accordance with the various programs described above until a vertically scaled array VA of the image is generated.

A portion of vertically scaled array VA representative of the image of hatch marks 256A-256E is illustrated diagrammatically in FIG. 41. Indicia 256A-256E are illustrated graphically in FIG. 41 for purposes of example. However, it is to be understood that the magnitude of the image at the particular pixel locations of indicia 256A-256E in vertically scaled array VA are actually represented by pixel values $PVn, m_V$.

Since hatch marks 256A-256E are separated by known distances on template 250, these known distances would correspond to predetermined numbers of pixel locations PLn,m in the horizontal or "m" direction of vertically scaled array VA. In the embodiment of template 250 illustrated in FIG. 32, hatch marks 256A-256G are separated by known distances. Were there no horizontal scale error, the representation of each hatch mark 256A-256G would be separated from each other in the horizontal direction of array VA by the same predetermined number (e.g., three) pixel locations PLn,m. However, due to the scale errors inherent in prism 20A, hatch marks 256A-256G will be separated by differing numbers of pixel locations PLn,m. In the example shown in FIG. 41, hatch marks 256A and 256B are compressed, separated by no pixel locations PLn,m, and adjacent to one another. Hatch marks 256B and 256C are compressed, but not quite as much, and are separated by one pixel location PLn,m. Hatch marks 256D and 256E, on the other hand, are horizontally expanded from their normal positional relationship, and separated by four pixel locations PLn,m.

Data within table 310 characterizes locations of pixel values $PVn, m_H$ in horizontally scaled array HA as a function of the horizontal location within vertically scaled array VA at which the pixel value should be taken. With respect to FIG. 41, for example, it is assumed that pixel values $PVn,300_V$ will be correctly positioned in the same row of the horizontally scaled array HA. That is, pixel values $PVn,300,_H = PVn,300_V$. However, it is known that hatch mark 256B should be spaced from 256A by three pixel locations PLn,m in the example used above. Pixel values $PVn,301_V$ of vertically scaled array VA should therefore be positioned in column 304 of horizontally scaled array HA. Table 310, therefore, includes data which characterizes pixel values $PVn,304_H$ as being equal to pixel values $PVn,301_V$ of vertically scaled array VA.

Since hatch marks 256A and 256B were compressed due to the optical transfer properties of prism 20A, information therebetween is lost. Computer 200 thereby "fills in" this lost information by inserting or repeating pixel values $PVn,301_H-PVn,303_H$ of horizontally scaled array HA with information at one of either pixel values $PVn,300_V$ or $PVn,301_V$ of the vertically scaled array VA. In table 310, all pixel values $PVn,301_H-PVn,303_H$ are set equal to pixel values $PVn,301_V$ of vertically scaled array VA.

Following the above example, it is also known that hatch mark 256C should be spaced horizontally from hatch mark 256B by three pixel locations PLn,m. All pixel values $PVn,303_V$ of the 303rd column in the vertically scaled array VA should therefore actually be positioned in the 208th column of horizontally scaled array VA. Accordingly, computer 200 generates data within table 310 associating pixel values $PVn,303_V$ of vertically scaled array VA with pixel values $PVn,308_H$ of the horizontally scaled array HA. Portions of the image which were lost due to the compression between hatch marks 256B and 256C are "filled in" by repeating pixel values $Pvn,302_V$ of the vertically scaled array VA at pixel values $PVn,305_H-PVn,307_H$ of horizontally scaled array HA. Data characteristic of this filling in or repetition of pixel values is characterized in table 310. Procedures similar to those described above are repeated for pixel values $PVn,312_H$ of horizontally scaled array HA which should actually be equal to pixel values $PVn,306,_V$ of the vertically scaled array VA.

Hatch marks 256D and 256E would also be separated by three pixel locations PLn,m were no vertical scaling errors inherent in prism 20A. However, hatch marks 256D and 256E have been "expanded" by the optical properties of prism 20A, and they are actually separated by four pixel locations PLn,m. In other words, pixel values $PVn,311,_V$ in vertically scaled array VA should actually be spaced from pixel values $PVn,312_H$ of horizontally scaled array HA (which correspond to pixel values $PVn,306_V$ in vertically scaled array VA) by three pixel locations PLn,m. Accordingly, computer 200 causes data representative of the fact that pixel values $PVn,316,_H$ of horizontally scaled array HA should actually be equal to pixel values $PVn,311_V$ of vertically scaled array VA in table 310.

Since hatch marks 256D and 256E were expanded, portions of the image therebetween are redundant and must be eliminated. In this particular example, one column of pixel values $PVn,m_V$ must be eliminated from the vertically scaled array VA. In generating horizontal scale correction data in table 310, computer 200 has eliminated pixel values $PVn,308_V$ of vertically scaled array VA.

The above procedure is carried out for all pixel values $PVn,1_H-PVn,M_H$ of horizontally scaled array HA to generate horizontal scale correction data in table 310 which characterizes the column within vertically scaled array VA from which each column of pixel values $PVn,m_H$ of horizontally scaled array HA should be taken. It has been found, however, that by horizontally scaling the image in this manner, that there will be no corresponding pixel values $PVn,m_V$ which are properly translated to positions near the left and right edges of horizontally scaled array HA. These portions of horizontally scaled array HA, typically for columns m less than 100 and m greater than 400 for a 512 pixel array are set equal to PVMAX so that they will be represented as white in the output image. Computer 200 causes data representative of this inherent feature to be stored in table 310 of horizontal scale correction data as illustrated in FIG. 40.

To generate horizontally scaled array HA, computer 200 utilizes data stored in memory and representative of table 310 (horizontal scale correction data) along with pixel values $PVn,m_V$ of vertically scaled array VA. For each pixel value $PVn,m_H$ of horizontally scaled array HA, computer 200 accesses table 310 to determine from which column of vertically scaled array VA the pixel value $PVn,m_H$ should be taken. For example, to produce horizontally scaled array HA from vertically scaled array VA shown in FIG. 35 utilizing horizontal scale correction data in table 310, pixel values $PVn,300_H$ will be set equal to corresponding pixel values $PVn,300_V$ of vertically scaled array VA. Pixel values $PV300,300_H$ of horizontally scaled array HA will, for example, be set equal to pixel value $PV300,300_V$ of vertically scaled array VA. Following a similar approach, pixel values $PVn,311_H$ of horizontally scaled array HA will be set equal to corresponding pixel values $PVn,305_V$. Utilizing the scaling data in table 310, all pixel values $PVn,1_H$ and $PVn,M_H$ are set equal to values PVMAX. Computer 200 will then store data representative of horizontally scaled array HA and RAM 202.

H. Threshold

After the digital data representative of fingerprint 143 (FIG. 15) has been imaged by camera 28 and processed by computer 200 in accordance with the Noise Average, Illumination Equalization, Directional Filter, Unhair, Curvature Correction, and Vertical and Horizontal Scaling programs, a horizontally scaled array HA of horizontally scaled pixel values $PVn,m_H$ representative of the fingerprint image is stored in RAM 202. Each pixel value $PVn,m_H$ is an eight-bit digital value representing intensity of the image at that particular discrete or pixel location $PLn,m$. This data will be utilized by printer 16 to print an enhanced visual representation of the fingerprint image.

In one embodiment, printer 16 is a matrix printer capable of printing in a gray scale at discrete locations. When system 10 includes a printer 16 of this type, computer 200 retrieves pixel values $PVn,m_H$ of horizontally scaled array HA from RAM 202, maps these pixel values into a proper format, and transmits this data to the printer. Printer 16 will then print a visual representation of the fingerprint image with the intensity at each discrete printed location determined by the pixel value $PVn,m_H$.

In another embodiment, printer 16 is a dot matrix printer, and incapable of utilizing pixel values $PVn,m_H$ to print a gray scale image at discrete locations or dots. At each discrete location on applicant card 15, printer 16 can either leave the spot blank, or make it black. As a result, computer 200 implements a Threshold program to determine whether each pixel value $PVn,m_H$ of the horizontally scaled array HA should be represented as a white or black spot by printer 16 on card 15.

Implementing the Threshold program, computer 200 compares each pixel value $PVn,m_H$ to a print threshold value TP. If the pixel value $PVn,m_H$ is less than the threshold value TP, this pixel value is to represent a "black" or printed region on applicant card 15, and computer 200 accordingly sets the pixel value to zero or "0". If the pixel value $PVn,m_H$ is greater than or equal to threshold value TP, this particular pixel value is to represent a white portion of the image, and computer 200 accordingly sets a pixel value equal to one or "1". Threshold value TP can vary depending upon a desired appearance of the fingerprint image. In one embodiment, threshold value TP is a digital value representative of an intensity halfway between the two hundred and fifty-six (i.e. 128) possible intensity values which can be represented by eight-bit pixel values $PVn,m_H$. If it is desired to have the black portions of the printed fingerprint image (valleys 138) to have a finer width, threshold value TP should be set to a value lower than 128. If it is desired to have the white portions of the image (ridges 136) to have a finer width, threshold value TP should be set to a level higher than 128.

Having generated a Threshold array of enhanced pixel values $PVn,m_H$, computer 200 stores these pixel values in RAM 202. In response to print signals, computer 200 will transmit these bits sequentially in a standard printer format to printer 16. In response, printer 16 will print the enhanced fingerprint image onto applicant card 15.

System Operation

Operation of fingerprinting system 10 is described with reference to FIGS. 1 and 42-47. Upon initial power-up, computer 200 will run a series of diagnostics which verify correct operation of computer 200, RAM 202, and ROM 204. After passing these diagnostics, data terminal 6 will generate a copyright notice which will be displayed on monitor 7 for several seconds. Following the copyright notice, data terminal 6 will generate and display on its monitor 8 a Main Display menu 300 illustrated in FIG. 42.

Having reviewed the availbale options presented on menu 300, an operator can select Option 1 by sequentially pressing the "1" and RETURN keys of keyboard 7 of data terminal 6 whenever a new booking is being processed. System 10 is then cleared of information from a previous booking, and reset so as to be ready to accept new information.

If it is desired to initiate fingerprint capture or recording, the operator can select option 2 by sequentially pressing the "2" and RETURN keys of keyboard 7. In response, data terminal 6 will generate and display Processing Choices menu 302 illustrated in FIG. 46. Having reviewed the available options presented on menu 302, if the operator desires not to capture fingerprints, they will select Option 0 from menu 302 by sequentially pressing the "0" and RETURN keys of keyboard 7. Data terminal 8 will then redisplay Main Display menu 300. Should the operator desired to capture fingerprints, Option 1 from menu 302 will be selected by sequentially pressing the "1" and RETURN keys of keyboard 7. Option 2 from menu 302 is selected if it is desired to capture only one fingerprint. This is done if it is desired to test system capabilities, or to edit a poor previously captured print. Option 2 is selected when the operator sequentially presses the "2" and RETURN keys of keyboard 7.

If an operator desires to change capture options, Option 3 is selected by sequentially pressing the "3" and RETURN keys of keyboard 7. In response to this option, the operator will be asked a series of questions by means of prompts displayed on monitor 8 of data terminal 6. These questions are answered by pressing the "Y" key of keyboard 7 to answer "yes", or by pressing the "N" key to answer "no." Options which can be selected in this manner include a High Contrast Capture Option which allows a very quick capture of print, but with relatively low quality due to the high contrast. The operator can also get an enlarged printed copy of one of the prints if desired. If the Enlarged Print Option is selected, both a life-size and four times normal size image of a fingerprint can be printed by printer 16. Also, the operator is asked if they would like to approve the print twice. The first chance to approve the print comes after capture, and the second chance comes after the image has been visually enhanced by the image enhancement software programs. Typically, prints are approved only once, that being after processing has been completed.

When Option 1 from menu 302 is selected, system 10 enters a capture mode during which all ten individual fingerprints, plus slap prints from both the left and right hands, will be captured. This procedure is implemented with the assistance of key pad 19 and display 13 on optics/processor unit 12.

Having selected Option 1 from menu 302 when it is desired to capture fingerprints, computer 200 will first actuate motor 76 to drive slap/finger image selection optics 26 to the finger prism select position illustrated in FIG. 2 (if optics 26 is not already so positioned). Signals representative of this positioning are provided to computer 200 by microswitch 89, where upon actuation of motor 76 is terminated. Computer 200 will then cause LED 316A of left hand indicia 312 to be lit, indicating a prompt that a fingerprint of the left thumb is to be captured. Simultaneously, computer 200 cause LEDs 21C and 21D to be lit, thereby illuminating keys 17C and 17D. The operator will then move trolley 42, using lever 52, to position a finger prism 20A-20D having the properly sized groove 102 for the thumb of the particular person being fingerprinted within aperture 51. The person being fingerprinted will then position their thumb within groove 102 of the selected prism 20A-20D, and adjust their finger within the groove while the operator observes image quality on monitor 14. When an image which it is desired to capture is displayed on monitor 14, the operator will actuate CAPTURE key 17C on key pad 19. This image is then "frozen", with digitizer 206 digitizing the data provided by TV camera 24. This data is then processed in accordance with the software programs described above to produce an array of data characterizing the enhanced fingerprint image. This data is then stored within RAM 202. If the person being fingerprinted was an amputee and did not have a left thumb, the operator would have actuated AMP key 17D. Computer 200 then stores data characteristic of this action.

If the "approve print twice" option was previously selected, the operator can further examine the image on monitor 14 prior to its being processed. If this option was selected, computer 200 will cause LEDs 21A and 21B to be lit, illuminating keys 17A and 17B to indicate that one of these keys is the correct response. If it is desired to continue processing this image, YES key 17A is actuated. If after further study, it is decided that this image is not acceptable, NO key 17B is actuated.

After the capture and processing of the left thumb fingerprint, computer 200 will cause LED 316B to be illuminated thereby prompting the operator that the left index finger is to be fingerprinted. The above described procedures are then repeated, with prompts for each of the ten fingers of the two hands of the person being fingerprinted being made.

After all ten fingers have been individually fingerprinted in the above-described manner, a prompt will be displayed on monitor 8 of data terminal 6 indicating that slap or plain prints for the left hand are to be taken. Computer 200 will also actuate motor 76 so as to drive mounting plate 60 to its slap print image selection position. Computer 200 will receive a signal from microswitch 87, and deactivate motor 76, when selection optics 26 are properly positioned at the slap image position illustrated in FIG. 3B. CAPTURE key 17C and AMP key 17D will also be lit. The person to be fingerprinted will then position the index, middle, ring and little fingers of the left hand on finger receiving surface 150 of slap print prism 18'. When the operator observes a high quality image on monitor 14, they will press CAPTURE key 17C which "freezes" this image, and causes it to be processed by the image enhancement software of processor subsystem 30. Data representative of this slap print image is then stored in RAM 202. This procedure is then repeated for the slap or plain prints of the right hand.

After the slap prints hsave been taken, Main Display menu 300 which is shown in FIG. 42 will again be displayed on monitor 8 of data terminal 6. The operator can then select Option 3 to enter demographic information regarding the person whose fingerprints have just been taken as well as to enter department information used by the police or other organization performing the fingerprinting. When Option 3 is selected, data terminal 6 will display on its monitor 8 a Demographic/Department Information menu such as 320 (FIG. 45) which requests the operator to enter all necessary demographic and department information. The operator can then enter this demographic information using the various keys of keyboard 7 of data terminal 6 in a standard manner. Main Display menu 300 can then again be displayed when the operator presses the RETURN key once all demographic and department information has been entered into terminal 6.

After all fingerprints have been captured and demographic/departmentinformation entered, the operator can select Option 4 to have all of this information printed on a standardized booking or applicant card such as 15 illustrated in FIG. 47. Applicant card 15 has standardized locations for all the various fingerprints which have been captured, as well as the demographic information and department information which has been entered into terminal 6. Card 15 will be inserted into printer 16 in an indexed manner. When Option 4 is selected, computer 200 causes all of the information retrieved from RAM 202 and to be printed at the proper locations on card 15.

Conclusion

In conclusion, the optical fingerprinting system of the present invention offers a number of significant advantages over those of the prior art. Both individual fingerprint and slap print images can be optically obtained. A real-time display of the fingerprint being imaged can be observed and analyzed prior to its capture. Grooves within the finger prisms are contoured in such a manner as to provide an optimum amount of contact between the fingerprint and the prism. The lens trolley, which has finger prisms with a variety of different sized grooves, permits used of the system with a wide range of finger sizes. The lensed surfsce of the finger and slap prisms reduces vertical and horizontal scale errors, as well as curvature correction errors. Furthermore, remaining scale and curvature errors are eliminated, and other characteristics of the fingerprint image greatly enhanced, through the use of the Image Enhancement programs. The system is also designed to be very user friendly.

Although the present invention has been described with reference to preferred embodiments, workers skilled in the art will recognize that changes may be made in form and detail without departing from the spirit and scope of the invention.

What is claimed is:

1. An optical fingerprinting system including:

slap print prism means for receiving a plurality of fingers and for providing an optical slap fingerprint image of the fingers;

a plurality of individual finger prism means having differently sized finger-receiving grooves, for receiving an individual finger and for providing an optical individual fingerprint image of the finger;

sensor means for imaging fingerprint images and for providing fingerprint information representative of the images;

slap/individual fingerprint image selection means for selectively causing the slap fingerprint image from the slap print prism means or an individual fingerprint image from a selected individual finger prism means to be propagated to the sensor means;

prism trolley means for mounting the plurality of individual finger prism means with respect to the slap/individual fingerprint image selection means, and for causing an individual fingerprint image from a selected one of the individual finger prism means to be propagated to the sensor means by the slap/individual fingerprint image selection means; and memory means coupled to the sensor means for storing the fingerprint information representative of the imaged fingerprint image.

2. The fingerprinting system of claim 1 and further including video monitor means coupled to the sensor means for providing a real-time video display of the imaged fingerprint image.

3. The fingerprinting system of claim 1 and further including printer means coupled to the memory means for providing a printed display of the imaged fingerprint image.

4. The fingerprinting system of claim 1 wherein the slap/individual fingerprint image selection means includes:

optics mounting means movable between a slap fingerprint select position and an individual fingerprint select position;

slap fingerprint image propagation optics means at least partially mounted to the optics mounting means for propagating the slap fingerprint image from the slap print prism means to the sensor means when the optics mounting means is positioned at the slap fingerprint select position; and individual fingerprint image propagation optics means at least partially mounted to the optics mounting means for propagating the individual fingerprint image from the selected individual finger prism means to the sensor means when the optics mounting means is positioned at the individual fingerprint select position.

5. The fingerprinting system of claim 4 wherein the slap fingerprint image propagation optics means and individual fingerprint image propagation optics means include a mirror.

6. The fingerprinting system of claim 4 wherein the slap fingerprint image propagation optics means and individual fingerprint image propagation optics means include a lens.

7. The fingerprinting system of claim 4 and further including:

motor means responsive to optics mounting position select signals for driving the optics mounting means between the slap fingerprint select position and the individual fingerprint select position; and control means responsive to operator selection for providing the optics mounting position select signals to the motor means.

8. The fingerprinting system of claim 1 wherein the prism trolley means includes:

a base movably mounted with respect to the slap/individual fingerprint image selection means; and fastener means for mounting the plurality of individual finger prism means to the base.

9. An optical fingerprinting system, including:

slap print prism means having a slap print receiving surface for receiving a plurality of fingers and for providing an optical slap fingerprint image of the fingers;

a plurality of individual finger prism means having differently sized finger-receiving grooves, for receiving an individual finger and for providing an optical individual fingerprint image of the finger;

video means for imaging the fingerprint images and for providing video signals representative of the images;

a trolley to which each of the plurality of individual finger prism means is mounted, for moving a selected individual finger prism means to a selected finger prism position;

slap/individual fingerprint image selection optics means for selectively propagating either an individual fingerprint image from the selected individual finger prism means at the selected finger prism position or a slap fingerprint image from the slap print prism means to the video means;

digitizer means coupled to the video means for digitizing the video signals and providing digital fingerprint data representative of the fingerprint images; and memory means coupled to the digitizer means for storing the fingerprint data.

10. The fingerprinting system of claim 9 and including video monitor means coupled to the video means for providing a real-time display of the fingerprint images.

11. The fingerprinting system of claim 9 and including printer means coupled to the memory means for providing a printed display of the fingerprint images represented by the fingerprint data.

12. The fingerprinting system of claim 9 wherein the slap/individual fingerprint image selection optics means includes:

optics mounting movably mounted with respect to the trolley and the slap print prism means between a slap fingerprint select position and an individual fingerprint select position;

slap fingerprint image propagation optics means at least partially mounted to the optics mounting means for propagating the slap fingerprint image about a slap print optical path from the slap print prism means to the video means when the optics mounting means is positioned at its slap fingerprint select position; and individual fingerprint image propagation optics means at least partially mounted to the optics mounting means for propagating the individual fingerprint image about an individual print optical path from the selected individual finger prism means at the selected finger prism position to the video means.

13. The fingerprinting system of claim 12 wherein the trolley and slap print means are mounted with respect to one another at vertically displaced positions.

14. The fingerprinting system of claim 12 and further including:

motor means responsive to optics mounting position select signals for driving the optics mounting means between the slap fingerprint select position and the individual fingerprint select position; and control means responsive to operator selection for providing the optics mounting position select signals to the motor means.

15. The fingerprinting system of claim 9 and further including actuator means for causing the trolley to move the selected individual finger prism means to the selected finger prism position.

16. The fingerprinting system of claim 15 wherein the actuator means includes a lever.

* * * * *